United States Patent
Antonio

(10) Patent No.: US 9,527,755 B2
(45) Date of Patent: Dec. 27, 2016

(54) METHOD AND APPARATUS FOR TREATING SEWAGE

(71) Applicants: De Asmundis Fulvio Antonio, Codogno (IT); Masoero Paolo, Castell'Arquato (IT)

(72) Inventor: De Asmundis Fulvio Antonio, Codogno (IT)

(73) Assignees: De Asmundis Fulvio Antonio, Codogno (Lodi) (IT); Masoero Paolo, (Piacenza) (IT)

( * ) Notice: Subject to any disclaimer, the term of this patent is extended or adjusted under 35 U.S.C. 154(b) by 413 days.

(21) Appl. No.: 14/104,629

(22) Filed: Dec. 12, 2013

(65) Prior Publication Data

US 2014/0166497 A1    Jun. 19, 2014

(30) Foreign Application Priority Data

Dec. 13, 2012    (IT) .............................. MI2012A2123

(51) Int. Cl.
*C02F 1/46* (2006.01)
*C02F 1/30* (2006.01)
(Continued)

(52) U.S. Cl.
CPC ........... *C02F 1/302* (2013.01); *B01D 19/0078* (2013.01); *B01J 19/126* (2013.01); *C02F 1/461* (2013.01); *C02F 1/46104* (2013.01); *H05B 6/80* (2013.01); *C02F 1/02* (2013.01); *C02F 1/36* (2013.01); *C02F 1/4672* (2013.01); *C02F 1/4676* (2013.01); *C02F 1/74* (2013.01); *C02F 1/78* (2013.01);
(Continued)

(58) Field of Classification Search
CPC ....... C02F 1/46104; C02F 1/461; C02F 1/302; C02F 1/4672; C02F 1/4676; C02F 1/74; C02F 1/02; C02F 1/36; C02F 1/78; C02F 2201/46155; C02F 2201/4619; B01J 19/126

See application file for complete search history.

(56) References Cited

U.S. PATENT DOCUMENTS 3,974,075 A * 8/1976 Saigh ....................... B63J 4/006
                                                  210/104
4,592,291 A    6/1986 Sullivan, III
(Continued)

FOREIGN PATENT DOCUMENTS

DE    102004042793 A1    3/2006
EP        0 412 175 A1    2/1991
(Continued)

OTHER PUBLICATIONS

European Search Report, European Application No. EP 13 19 6415.7, dated Jan. 17, 2014.
(Continued)

*Primary Examiner* — Arun S Phasge
(74) *Attorney, Agent, or Firm* — Jones Robb, PLLC

(57) ABSTRACT

Method for treating sewage, comprising at least one step of electrolytically treating sewage, an energy transfer step comprising at least one selected in the group comprising: a temperature raising treatment, an ultrasound treatment. The electrolytic treatment and energy transfer steps determining the dissociation from the sewage of gas comprising nitrogen. Further, the method comprises a step of separating gases comprising nitrogen from the mass of sewage.

31 Claims, 11 Drawing Sheets

(51) Int. Cl.
*C02F 1/461* (2006.01)
*B01J 19/12* (2006.01)
*B01D 19/00* (2006.01)
*H05B 6/80* (2006.01)
*C02F 1/02* (2006.01)
*C02F 1/36* (2006.01)
*C02F 1/467* (2006.01)
*C02F 1/74* (2006.01)
*C02F 1/78* (2006.01)
*C02F 103/20* (2006.01)

(52) U.S. Cl.
CPC .... *C02F 2103/20* (2013.01); *C02F 2201/4619* (2013.01); *C02F 2201/46155* (2013.01); *C02F 2209/001* (2013.01); *Y02E 50/343* (2013.01); *Y02W 30/47* (2015.05)

(56) References Cited

U.S. PATENT DOCUMENTS

| | | | |
|---|---|---|---|
| 5,403,564 | A | 4/1995 | Katschnig et al. |
| 5,725,762 | A | 3/1998 | Beal et al. |
| 6,187,988 | B1 | 2/2001 | Cha |
| 6,402,932 | B1 | 6/2002 | Bremer et al. |
| 6,517,711 | B1 | 2/2003 | Rummler et al. |
| 2004/0084380 | A1 | 5/2004 | Kicinski |
| 2006/0144800 | A1 | 7/2006 | Barreras et al. |

FOREIGN PATENT DOCUMENTS

| | | |
|---|---|---|
| EP | 1 008 557 A1 | 6/2000 |
| WO | WO 03/000594 A1 | 1/2003 |
| WO | WO 03/062495 A2 | 7/2003 |
| WO | WO 2009/087507 A1 | 7/2009 |
| WO | WO 2010/015928 A1 | 2/2010 |

OTHER PUBLICATIONS

European Search Report, European Application No. EP 13 19 6414.0, dated Jan. 20, 2014.

Cravotto, G. et al., "A new flow reactor for the treatment of polluted water with microwave and ultrasound", *Journal of Chemical Technology and Biotechnology*, vol. 82, No. 2, (2007), pp. 205-208.

De Lima Leite, R.H. et al., "Anodic oxidation of 2,4-dihydroxybenzoic acid for wastewater treatment: study of ultrasound activation", *Chemical Engineering Science*, vol. 57, No. 5, (2002), pp. 767-778.

Trabelsi, F. et al., "Oxidation of Phenol in Wastewater by Sonoelectrochemistry", *Chemical Engineering Science*, vol. 51, No. 10, pp. 1857-1865 (1996).

Zhao, G. et al., "Electrochemical incineration of high concentration azo dye wastewater on the in situ activated platinum electrode with sustained microwave radiation", *Chemosphere*, vol. 77, No. 2, (2009), pp. 188-193.

Search Report, Italian Application No. MI20122123, dated Aug. 6, 2013.

Search Report, Italian Application No. MI20122124, dated Aug. 7, 2013.

Search Report, Italian Application No. MI20122125, dated Aug. 8, 2013.

Non-Final Office Action dated Sep. 21, 2015 in U.S. Appl. No. 14/104,649.

Response to Non-Final Office Action filed Dec. 21, 2015 in U.S. Appl. No. 14/104,649.

Notice of Allowance dated Mar. 8, 2016 in U.S. Appl. No. 14/104,649.

\* cited by examiner

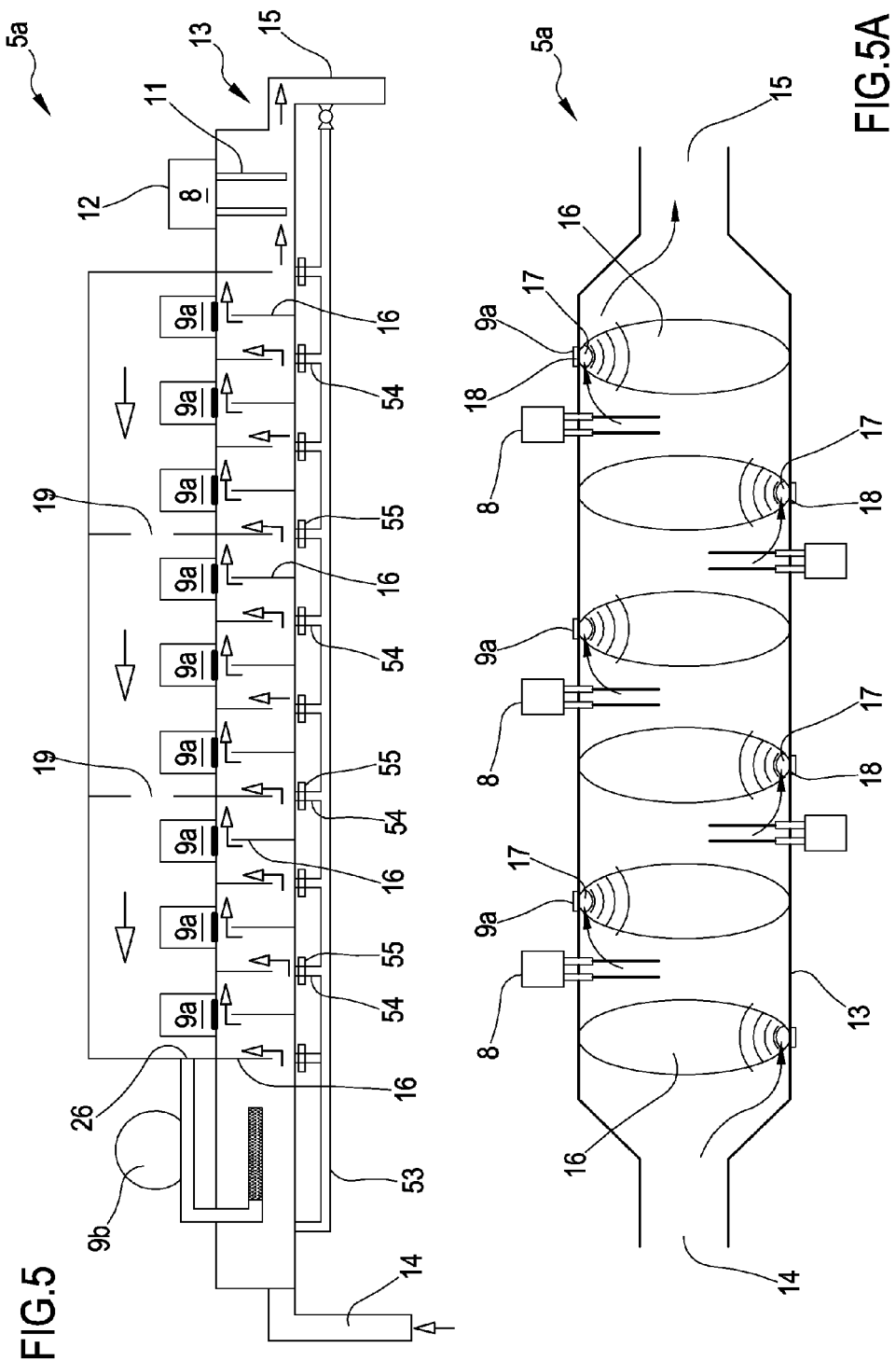

METHOD AND APPARATUS FOR TREATING SEWAGE

This application claims priority to Italian Application No. MI2012A002123, filed on Dec. 13, 2012 the entire contents of which is incorporated herein by reference.

FIELD OF THE INVENTION

The present invention relates to a method and apparatus for treating sewage.

The apparatus and method, object of the invention, find application in the zootechnical field for managing and exploiting sewage and/or waste of animal origin.

Moreover, the present invention can find an application in the field of wastewater treatment coming from: agricultural systems, food farming industry, waste management systems, systems for producing power from biogas, residential water (foul water) treatment systems.

TECHNICAL BACKGROUND

It is known, in the industrial and agricultural fields, the use of apparatus and methods for treating wastewater and sludge comprising sewage in order to dispose of the undesired substances, in order to reduce the toxicity and purify such water and/or sludge in order to enable a correct recovery or disposal.

Particularly, methods and apparatus for treating residential and/or industrial wastewater using chemical, mechanical and/or thermal processes configured to treat the substance in order to reduce at a minimum the presence of micropollutants, are known. Since the toxicity of the wastewater and/or sewage is at least partially caused by the presence of pollutants, such as ammonia nitrogen $NH_3$ and carbon dioxide methods/apparatus for treating sewage, capable of extracting from the latter ammonia dissolved as $NH_4^+$ and ensuring the abatement of the ammonia nitrogen $NH_3$ have been introduced.

For example, a first approach described in patent application WO2010/0015928 A1 provides a process of extracting ammonia nitrogen ($NH_3$) from wastewater. The process provides the introduction of the wastewater in a reactor inside which basifying agents adapted to react with the wastewater for taking the pH to the natural value are supplied: so that, ammonia nitrogen contained in the wastewater tends to separate from the latter as a gas ($NH_3$). The process provides the generation of a gaseous flow inside the reactor, adapted to extract ammonia nitrogen developed during the chemical reaction between wastewater and basifying agents. In order to increase the ammonia nitrogen extraction efficiency, the process provides a step of heating the wastewater and a treating step by means of ultrasound.

Despite the method described in first solution enables to extract ammonia nitrogen from wastewater, the method itself is not devoid of disadvantages and limitations.

De facto, the wastewater treatment by means of chemical additives make the method expensive and difficult to control. Specifically, the treatment by means of chemical additives is hardly manageable under conditions wherein it is necessary to treat wastewater having different concentrations of dissolved substances: in this case, the adjustment of the additive to be introduced in the substance is hardly calculatable and adaptable to diversified conditions of the liquid. It should not be disregarded that the chemical treatment of wastewater substantially prevents from reusing the liquid itself, for example for producing compost or biogas.

In a second approach described in documents U.S. Pat. No. 6,555,011 and DE102004050493, it is provided a treatment for sanitizing and purifying biological fluids. The method provides a first step wherein the fluid passes through a reactor defining inside a forced passage for the fluid. Inside the reactor and at the forced passage points there are devices adapted to sanitize the fluid. Particularly, the method provides the formation of predetermined areas with high energy density at the forced fluid passages: in this way, when the fluid flows through the reactor, the devices are capable of energising the latter in order to purify and sanitize it.

In a third approach described in document WO 2007/115660 it is provided a method for treating sewage in order to produce a fertilizer; the object of this method consists of removing dissolved substances, particularly ammonia nitrogen $NH_3$ and carbon dioxide $CO_2$, present in the liquid to be treated.

More particularly, the method provides the extraction of the ammonia nitrogen from sewage thanks to the use of ultrasounds, and the depuration of the stripping gases by a solution of water and sulphuric acid.

Still more particularly, the method comprises a first step of introducing sewage in a first tank; the sewage is treated by ultrasounds at a frequency comprised between 0.2 MHz and 1.7 MHz. The use of ultrasounds at the specific frequency generates inside the fluid a phenomenon called cavitation which enables to degas the fluid and release $CO_2$ and $NH_3$ from the same. Gases ($CO_2$ and $NH_3$) released by fluid, are then introduced, by means of a compressor, in a second tank. Inside the second tank there is a solution containing sulphuric acid ($H_2SO_4$) which is made soluble with the gases ($CO_2$ and $NH_3$) extracted from first tank. Also the solution present in second tank is treated by ultrasounds at a frequency of 1.7 MHz, which, in this step, enable to release ammonium sulphate ($[NH_4]2SO_4$) and carbon dioxide.

Also the methods/apparatus described in second and third approaches are not devoid of disadvantages and limitations. Particularly, these methods are not capable of ensuring an acceptable abatement of bacteria present in the liquid adapted to ensure a reuse of the latter for forming a fertilizer.

OBJECT OF THE INVENTION

Therefore, the object of the present invention consists of substantially overcoming one or more of the disadvantages and/or limitations of the preceding solutions.

A first object of the invention consists of providing a method and apparatus for treating sewage which enables to reuse the treated sewage as a substrate for producing compost and/or biogas and/or fertilizer, and promote following sewage depurations.

A further main object of the invention consists of providing a method and apparatus for treating sewage which enable to effectively eliminate the majority of microorganisms, such as bacteria, moulds, mould spores and bacteria present in the sewage.

It is a further object of the invention to provide a method and apparatus for treating sewage which enable an effective extraction of ammonia nitrogen from sewage.

Then, it is an object of the invention to provide a method and apparatus for treating sewage capable of treating sewage with a reduced energy consumption in order to substantially reduce its operating costs.

One or more of the above described objects and which will be better explained in the following description, are substantially met by a method and apparatus for treating sewage, according to one or more of the attached claims.

In the following, aspects of the invention will be described.

In a 1st aspect, it is provided a sewage treatment method, comprising the following steps:
- at least one step of electrolytically treating the sewage,
- at least one energy transfer step comprising at least one selected from a group comprising:
  - a temperature raising treatment,
  - an ultrasound treatment,
  said electrolytic treatment and energy transfer steps determining the dissociation from the sewage of gases comprising nitrogen, preferably ammonia,
- at least one step of separating gases comprising nitrogen, preferably ammonia, from the mass of sewage.

In a 2nd aspect according to the preceding aspect, the treatment and transfer steps determine the dissociation from sewage of gases comprising at least ammonia thanks to an oxidation and/or reduction process.

In a 3rd aspect according to anyone of the preceding aspects, the energy transfer step comprises a microwave electromagnetic treatment step and a step of blowing into the sewage at least one gas, particularly air, having a temperature greater than the temperature of the sewage to be treated, in order to promote the oxidation and heating of the latter.

In a 4th aspect according to anyone of the preceding aspects, the energy transfer step comprises heating the sewage for taking the latter to a temperature comprised between 25° C. and 90° C., particularly between 30° and 85° C., still more particularly between 35° C. and 80° C.

In a 5th aspect according to anyone of the preceding aspects, the treatment and transfer steps determine the degradation of the organic compounds having a high molecular weight, present in the mass of sewage into organic compounds having a lower molecular weight.

In a 6th aspect according to anyone of the preceding aspects, the energy transfer step comprises a step of blowing into the sewage at least one gas comprising air and/or ozone suitable for promoting the sewage oxidation.

In a 7th aspect according to anyone of the preceding aspects, the electrolytic treatment provides the arrangement of at least two electrodes (11) at least partially contacting the sewage, and electrically connected to an electric power generator (12).

In an 8th aspect according to anyone of the preceding aspects, the microwave electromagnetic treatment comprises the generation of microwaves by at least one microwave generator (9a), particularly a magnetron.

In a 9th aspect according to the preceding aspect, microwave generator (9a) is configured to generate waves at a frequency comprised between 1 GHz and 4 GHz, particularly between 1.5 GHz and 3 GHz, still more particularly between 2.3 GHz and 2.6 GHz.

In a 10th aspect according to aspect 8th or 9th, the method comprises a step of cooling the microwave generator (9a) by an air flow, and wherein the sewage heating and oxidation comprise a substep of reintroducing into the sewage the air exiting the microwave generator (9a) cooling step.

In an 11th aspect according to anyone of the preceding aspects, during the electrolytic treatment step and/or during the energy transfer step, there is a step of mechanically stirring sewage.

In a 12th aspect according to anyone of the preceding aspects, the electrolytic treatment step and energy transfer step provide the treatment of a predetermined sewage amount for a predetermined treatment time.

In a 13th aspect according to the preceding aspect, the predetermined sewage amount has a volume greater than 0.5 $m^3$, particularly comprised between 0.5 $m^3$ and 50 $m^3$, still more particularly comprised between 1 $m^3$ and 10 $m^3$, and wherein the predetermined treatment time has a duration greater than 15 minutes, particularly comprised between 15 minutes and 300 minutes, still more particularly a duration comprised between 30 minutes and 120 minutes.

In a 14th aspect according to aspect 12th or 13th, during the electrolytic treatment step and energy transfer step, at least a portion of the predetermined sewage amount is caused to continuously recirculate inside a closed circuit.

In a 15th aspect according to the preceding aspect, during the step of recirculating the sewage inside the closed circuit, the latter passes through at least one forced passage, at least one between said pair of electrodes (11), and microwave generator (9a) being positioned at said forced passage in order to respectively enable to transfer the energy to the sewage passing from said forced passage and promote the dissociation of gases comprising at least nitrogen, preferably ammonia, from sewage.

In a 16th aspect according to the preceding aspect, during the sewage circulation step in the closed circuit, the following substeps are provided:
- forcing the sewage to pass through a plurality of consecutive forced passages (17),
- irradiating sewage passing through said forced passages, the irradiating substep using electromagnetic waves generators (9a) operating at a series of said forced passages (17), particularly, wherein the forcing step is such to form, at said forced passages (17), corresponding sewage currents having a limited thickness, not greater than 10 mm, particularly not greater than 6 mm, facing at least a corresponding microwave generator (9a) such as to be entirely crossed by said electromagnetic waves.

In a 17th aspect according to anyone of the preceding aspects, the energy treatment step comprises at least one ultrasound treatment step, following the electrolytic treatment and heating treatment steps, suitable for promoting the dissociation from the sewage of gases comprising at least nitrogen, preferably ammonia.

In an 18th aspect according to the preceding aspect, the sewage ultrasound treatment step provides to irradiate the sewage by means of ultrasonic waves having a frequency greater than 20 kHz, particularly comprised between 25 kHz and 45 kHz, still more particularly comprised between 30 kHz and 35 kHz.

In a 19th aspect according to aspect 17th or 18th, during the ultrasound treatment step, the method comprises a step of blowing at least one gas inside sewage, suitable for promoting the oxidation of sewage and release of gases comprising nitrogen, preferably ammonia, from the sewage itself.

In a 20th aspect according to the preceding aspect, gas blown during the sewage ultrasound treatment step comprises air, particularly comprises oxygen and/or ozone.

In a 21st aspect according to anyone of aspects from 14th to 20th, the ultrasound treatment step provides a substep of withdrawing a portion of the sewage treated in the electrolytic treatment and energy transfer steps, and a substep of integrating the sewage treated in the electrolytic treatment and energy transfer steps, with not treated sewage, for keeping constant said predetermined amount.

In a 22nd aspect according to anyone of aspects from 17th to 21st, the ultrasound treatment has a time duration greater than 30 minutes, particularly greater than 50 minutes, still more particularly comprised between 50 minutes and 300 minutes.

In a 23rd aspect according to the preceding aspect, the predetermined sewage amount, treated during the electrolytic treatment step and the energy transfer step, is greater than the sewage amount treated during the ultrasound treatment step, and wherein the ratio of the predetermined sewage amount treated during the electrolytic treatment step and energy transfer step, to the sewage treated during the ultrasound treatment step is greater than 2, particularly greater than 3.

In a 24th aspect according to anyone of the preceding aspects, the method comprises at least one step of collecting gases containing ammonia, separated from sewage, and a following step of refining the withdrawn gases, comprising:
blowing gases collected in an acid liquid solution,
forming ammonium salts by a salification of the ammonia present in gases collected with $H^+$ ions of the acid liquid solution,
forming a first purified gas flow containing a percentage of nitrogen, preferably ammonia, lower than the nitrogen percentage, preferably ammonia, present in the collected gases,
abating nitrogen possibly present in the first purified gas flow for forming a second purified gas flow containing a nitrogen percentage, preferably ammonia, less than the percentage present in the first gas flow.

In a 25th aspect according to the preceding aspect, the method comprises a plurality of steps of said refining steps consecutive to each other, for obtaining purified gases with lower and lower nitrogen contents, preferably ammonia.

In a 26th aspect according to aspect 24th or 25th, the method comprises at least one step of chemically filtering the purified gases exiting the last refining step by active carbon filters.

In a 27th aspect, it is provided an apparatus (1) for treating sewage, comprising:
at least one sewage treatment circuit (2) having at least one inlet (3) for receiving a sewage load to be treated, and at least one outlet (4) for enabling the expulsion of the treated sewage;
at least one first tank (5) operatively active on said treatment circuit (2), said first tank (5) comprising at least one inlet (6) fluidically communicating with circuit (2) inlet (3), and at least discharge outlet (7) fluidically communicating with at least one treatment circuit (2) outlet (4);
at least one electrolytic cell (8) associated to first tank (5) and configured to subject sewage, present inside or coming from first tank (5), for promoting the formation of gases comprising nitrogen, preferably ammonia;
at least one energising device (9) associated to first tank (5) and configured to subject sewage, present inside or coming from first tank (5), to at least one treatment selected in the group comprising:
a temperature raising treatment,
an ultrasound treatment,
said energising device (9) being configured to enable the oxidation and/or reduction of sewage, and promote the dissociation of gases comprising nitrogen, preferably ammonia,
at least one gas recovering circuit (10) fluidically communicating with first tank (5), suitable for enabling a flow of gases, comprising nitrogen, preferably ammonia, to exit first tank.

In a 28th aspect according to aspect 27th, the apparatus comprises at least one recirculation device (5a) comprising:
an auxiliary tank (13),
an inlet branch (14) to auxiliary tank, suitable for enabling to withdraw sewage from first tank (5), and
an outlet branch (15) from auxiliary tank, suitable for enabling to reintroduce sewage into first tank (5).

In a 29th aspect according to the preceding aspect, auxiliary tank (13) of recirculating device (5a) is positioned outside first tank (5), inlet branch (14) of auxiliary tank (13) being configured to withdraw sewage present in first tank (5) substantially at the bottom of the latter, outlet branch (15) of auxiliary tank (13) being configured to reintroduce sewage in first tank (5) substantially at, or above, a maximum level reachable by sewage in first tank (5).

In a 30th aspect according to anyone of aspects from 27th to 29th, the electrolytic cell (8) comprises:
at least one pair of electrodes (11) extending inside a volume defined by first tank (5), or inside recirculating device, in order to contact sewage,
at least one electric power generator (12) connected to the pair of electrodes (11).

In a 31st aspect according to anyone of aspects from 27th to 30th, energising device (9) comprises at least one microwave generator (9a), for example a magnetron, configured to irradiate sewage present in first tank (5) and/or in recirculating device by executing at least partially said temperature raising treatment.

In a 32nd aspect according to anyone of aspects from 28th to 31st, energising device (9) comprises at least one blowing device (9b) connected to first tank (5) and/or to recirculating device (5a), and configured to introduce in at least one of the latter, air at a temperature comprised between 25° C. and 90° C., particularly between 30° C. and 85° C., still more particularly between 35° C. and 80° C., by executing at least partially said heat treatment.

In a 33rd aspect according to anyone of aspects from 27th to 32nd, at least one between electrolytic cell (8) and energising device (9) is active at said recirculating device (5a).

In a 34th aspect according to anyone of aspects from 28th to 33rd, auxiliary tank (13) has inside at least one choke (16) suitable for defining at least one forced passage (17) of sewage circulating in said auxiliary tank (13).

In a 35th aspect according to the preceding aspect, auxiliary tank (13) comprises a plurality of chokes (16), each of them defines a corresponding forced passage (17) of the sewage circulating in said auxiliary tank (13).

In a 36th aspect according to the preceding aspect, apparatus comprises at least one microwaves generator (9a), for example a magnetron, externally engaged to auxiliary tank (13), substantially at at least one forced passage (17), and configured to generate electromagnetic waves in the direction of the latter, and wherein auxiliary tank (13) comprises at said forced passage (17), at least one window (18) radio-transparent to the frequencies of said electromagnetic radiation.

In a 37th aspect according to aspect 35th or 36th, each of said forced passages has a height, measured perpendicularly to the sewage advancement direction, comprised between 15 mm and 60 mm, particularly comprised between 20 mm and 50 mm, still more particularly comprised between 25 mm and 45 mm.

In a 38th aspect according to anyone of aspects from 27th to 37th, apparatus comprises at least one sewage stirring device (20) associated to first tank (5) and configured to move sewage present inside the latter.

In a 39th aspect according to the preceding aspect, stirring device (20) comprises at least one helix (21) at least partially immersed in sewage present inside first tank (5), said stirring device (20) further comprising at least one motor (22) connected to helix (21) and configured to rotate the latter in order to move the sewage present in first tank (5).

In a 40th aspect according to anyone of aspects from 27th to 38th, first tank (5) defines inside a compartment having a volume greater than 0.5 m$^3$ particularly comprised between 1 m$^3$ and 50 m$^3$, still more particularly comprised between 1 m$^3$ and 10 m$^3$.

In a 41st aspect according to anyone of aspects from 28th to 40th, auxiliary tank (13) defines inside a compartment having a volume comprised between 0.25 m$^3$ and 10 m$^3$, particularly comprised between 0.5 m$^3$ and 5 m$^3$, still more particularly comprised between 1 m$^3$ and 5 m$^3$, and wherein the ratio of the compartment volume of first tank (5) to compartment volume of auxiliary tank (13) is greater than 1, particularly greater than 2, still more particularly greater than 3.

In a 42nd aspect according to anyone of aspects from 27th to 41st, apparatus comprises at least one second tank (23) operatively active on said treatment circuit (2) and interposed between first tank (5) and treatment circuit (2) outlet (4), said second tank (23) comprising at least one inlet (24) fluidically communicating with discharge outlet (7) of first tank (5) and at least one corresponding discharge outlet (25) fluidically communicating with the at least one treatment circuit (2) outlet (4), and wherein said apparatus (1) further comprises at least one ultrasound generator (27) configured to irradiate sewage present in second tank (23) in order to promote the dissociation of gases comprising at least ammonia.

In a 43rd aspect according to the preceding aspect, ultrasound generator (27) is configured to generate ultrasounds at a frequency greater than 20 kHz, particularly comprised between 25 kHz and 45 kHz, still more particularly between 30 kHz and 35 kHz.

In a 44th aspect according to aspect 42nd or 43rd, second tank (23) comprises a gas inlet (28) to second tank (23), said gas inlet (28) being substantially positioned at the bottom of second tank (23), said apparatus (1) comprising a blowing device (29) fluidically communicating with gas inlet (28) of second tank (23), suitable for blowing at least one gas inside the latter, said gas comprising air, particularly oxygen and/or ozone.

In a 45th aspect according to the preceding aspect, blowing device (29) comprises at least one compressor (30).

In a 46th aspect according to anyone of aspects from 41st to 45th, second tank (23) defines inside a compartment having a volume greater than 0.2 m$^3$, particularly comprised between 0.3 m$^3$ and 10 m$^3$, still more particularly comprised between 0.5 m$^3$ and 5 m$^3$.

In a 47th aspect according to the preceding aspect, the ratio of the volume of first tank (5) compartment to volume of second tank (23) compartment is greater than 2, particularly greater than 3, still more particularly greater than 4.

In a 48th aspect according to anyone of aspects 41st to 47th, second tank (23) comprises an outlet (31) substantially located at the top of the latter, said gas outlet (31) fluidically communicating second tank (23) to gas recovering circuit (10) in order to enable the passage of gases containing at least ammonia from second tank (23) to gas recovering circuit (10).

In a 49th aspect according to anyone of aspects from 27th-48th, apparatus comprises at least one third tank (32) comprising:

a lower zone (32a) suitable for receiving a liquid phase acid solution (A), and an upper zone (32b) located above and fluidically communicating with said lower zone (32a) and suitable for receiving a gaseous phase, at least one gas inlet (33) located in proximity of a bottom of said third tank (32), and suitable for fluidically communicating lower zone (32a) to gas recovering circuit (10), at least one gas outlet (34) located at a top zone of third tank (32) and suitable for fluidically communicating upper zone (32ab) to a gas outlet line (35).

In a 50th aspect according to the preceding aspect, acid solution (A) comprises at least one of:
a diluted solution of sulphuric acid and distilled water;
sulphuric acid.

In a 51st aspect according to the preceding aspect, acid solution (A) comprises at least sulphuric acid and distilled water, the mass percentage of sulphuric acid present in acid solution (A) is greater than or equal to the mass percentage of distilled water present inside the acid solution, particularly wherein the ratio of the mass percentage of sulphuric acid to mass percentage of distilled water present in acid solution is greater than 1, particularly greater than 1.5.

In a 52nd aspect according to anyone of aspects from 50 to 51st, acid solution (A) is configured to determine, following a contact with gases arriving from inlet (33), the salification of ammonia present in said gases with H$^-$ ions of said acid solution (A) in order to generate a first flow of purified gas comprising ammonia in a percentage smaller than the ammonia percentage present in gases entering the third tank (32).

In a 53rd aspect according to the preceding aspect, third tank (32) comprises at least one filtration element (37) positioned in the upper zone (32b), said filtration element (37) being configured to intercept the first purified gas flow in order to enable the formation of a second purified gas flow comprising a percentage of nitrogen, particularly ammonia, less than the nitrogen percentage, particularly ammonia, present in first purified gas flow.

In a 54th aspect according to the preceding aspect, filtration element (37) comprises a recovery plate (38) having a lower surface having an arched profile showing a concavity facing the lower zone (32a).

In a 55th aspect according to anyone of aspects from 27th to 54th, apparatus comprises at least one active carbon filter (39) operatively active on outlet line (35), and configured to treat the purified gas flow exiting third tank (32).

In a 57th aspect, it is provided a method of treating sewage, comprising the following step:
at least one step of energising sewage by at least one selected in the group comprising:
subjecting to an ultrasound treatment,
subjecting to a microwave electromagnetic treatment,
subjecting to an electrolytic process,
in order to enable to dissociate from sewage gases comprising nitrogen, preferably ammonia,
at least one step of collecting said gases separated from sewage,
at least one step of refining the collected gases, comprising the following substeps:
blowing collected gases in an acid liquid solution (A),
forming salts of ammonium by salification of ammonia present in collected gases with H$^+$ ions of the liquid acid solution,
forming a first flow of purified gas containing a percentage of nitrogen, preferably ammonia, smaller than the nitrogen percentage present in collected gases, abating nitrogen possibly present in first purified gas flow for forming a second purified gas flow containing a nitrogen percentage smaller than the percentage present in first gas flow.

In a 58th aspect according to the preceding aspect, the method comprises a plurality of said refining steps consecutive to each other for obtaining purified gases having smaller and smaller contents of nitrogen, particularly ammonia.

In a 59th aspect according to aspect 57th or 58th, the acid liquid solution (A) comprises at least one of:
a diluted solution of sulphuric acid and distilled water, sulphuric acid.

In a 60th aspect according to the preceding aspect, the acid solution (A) comprises distilled water and sulphuric acid, and wherein the ratio of the percentage of sulphuric acid to percentage of distilled water present in acid liquid solution is greater than 1, particularly greater than 1.25, still more particularly greater than 1.5.

In a 61st aspect according to anyone of aspects from 57th to 60th, sewage energising step provides a treatment of a predetermined sewage amount.

In a 62nd aspect according to the preceding aspect, the step of energising the predetermined sewage amount takes a time greater than 30 minutes, particularly comprised between 50 minutes and 400 minutes, still more particularly between 50 minutes and 300 minutes.

In a 63rd aspect according to aspect 61st or 62nd, the predetermined sewage amount has a volume greater than 0.25 m$^3$, particularly between 0.5 m$^3$ and 10 m$^3$, still more particularly comprised between 0.5 m$^3$ and 5 m$^3$.

In a 64th aspect according to anyone of aspects from 57th to 63rd, during the sewage energising step, said method comprises a step of blowing at least one gas inside the sewage for promoting the oxidation of sewage and causing the gases to exit the same sewage.

In a 65th aspect according to the preceding aspect, the gas blown during the sewage energising step comprises air, particularly oxygen and/or ozone.

In a 66th aspect according to anyone of aspects from 57th to 65th, sewage energising step provides an ultrasound treatment, at a frequency greater than 20 kHz, particularly comprised between 25 kHz and 45 kHz, still more particularly between 30 kHz and 35 kHz.

In a 67th aspect according to anyone of aspects from 57th to 66th, method comprises a step of pre-treating the sewage, before the sewage energising step, which comprises at least one selected in the group among:
a temperature raising treatment,
an electrolytic treatment,
an oxygenation treatment.

In a 68th aspect according to anyone of aspects from 57th to 67th, pre-treatment step comprises a step of blowing inside sewage at least one gas suitable for promoting the oxidation of sewage with a following dissociation from the latter of gases comprising nitrogen, particularly ammonia.

In a 69th aspect according to the preceding aspect, the gas blown into the sewage has a temperature greater than the temperature of the sewage to be treated in order to promote the oxidation and heating of the latter.

In a 70th aspect according to anyone of aspects from 67th to 69th, the pre-treatment step provides the use of an electrolytic cell (8) suitable for enabling the dissociation from sewage of gases comprising nitrogen, preferably ammonia, by electrolysis.

In a 71st aspect according to the preceding aspect, electrolytic cell (8) comprises at least one pair of electrodes (11) connected to at least one electric power generator (12), the electrolytic treatment step providing the arrangement of electrodes (11) in order to partially contact the sewage.

In a 72nd aspect according to anyone of aspects from 67th to 71st, the pre-treatment step provides a step of electromagnetically treating by microwave the sewage, suitable for enabling the heating of the latter and inducing in the sewage a chemical reaction suitable for promoting the dissociation from the latter of gases comprising nitrogen, preferably ammonia.

In a 73rd aspect according to the preceding aspect, the microwave electromagnetic treatment provides the arrangement of a microwave generator (9$a$).

In a 74th aspect according to aspect 72nd or 73rd, microwave generator is configured to generate waves at a frequency comprised between 1 GHz and 4 GHz, particularly between 1.5 GHz and 3 GHz, still more particularly between 2.3 GHz and 2.6 GHz.

In a 75th aspect according to aspect 72nd or 73rd or 74th, the method comprises at least one step of cooling the microwave generator (9$a$) by an air flow, and wherein the heating and/or oxygenation of sewage occurs by blowing into the sewage the air exiting the microwave generator (9$a$) cooling step.

In a 76th aspect according to anyone of aspects from 67th to 75th, the pre-treatment step comprises a step of moving and stirring sewage.

In a 77th aspect according to anyone of aspects from 72nd to 76th, the microwave treatment step and/or step of blowing gases in sewage, heats the latter to take it to a temperature comprised between 25° C. and 90° C., particularly between 30° C. and 85° C., still more particularly between 35° C. and 80° C.

In a 78th aspect according to anyone of aspects from 67th to 77th, gases formed during the pre-treatment step and/or during the sewage energising step are blown into the liquid acid solution (A) of at least one refining step.

In a 79th aspect according to anyone of aspects from 67th to 78th, pre-treatment step provides the treatment of a predetermined sewage amount.

In an 80th aspect according to the preceding aspect, the predetermined sewage amount treated in the pre-treatment step is greater than the predetermined sewage amount treated in the energising step, and wherein the ratio of the predetermined sewage amount treated in the pre-treatment step to the predetermined sewage amount treated in the energising step is greater than 2, particularly is greater than 3.

In an 81st aspect according to aspect 79th or 80th, the predetermined sewage quantity treated in the pre-treatment step, has a volume greater than 0.5 m$^3$, more particularly comprised between 0.5 m$^3$ and 40 m$^3$, still more particularly comprised between 1 m$^3$ and 10 m$^3$.

In an 82nd aspect according to aspect 79th or 80th or 81st, the step of pre-treating the predetermined sewage amount takes a time greater than 15 minutes, particularly comprised between 30 and 400 minutes, still more particularly a time comprised between 30 minutes and 120 minutes, particularly wherein the pre-treatment step has a duration substantially equal to the duration of the energising step.

In an 83rd aspect according to anyone of aspects from 79th to 82nd, during the pre-treatment step, at least a portion of the predetermined sewage amount is continuously recirculated inside a closed circuit.

In an 84th aspect according to anyone of aspects from 57th to 83rd, method comprises at least one step of expelling gases wherein the latter, exiting the last refining step, are passed through at least one active carbon filter (39) suitable for treating gases in order to enable to purify the latter for releasing them in the environment.

In an 85th aspect according to anyone of aspects from 57th to 84th, the treatment and transfer steps determine the dissociation from sewage of gases comprising at least ammonia thanks to an oxidation and/or reduction process.

In an 86th aspect, it is provided an apparatus (1) for treating sewage, comprising:
- at least one sewage treatment circuit (2) comprising at least one inlet (3) for receiving a sewage load to be treated, and at least one outlet (4) for enabling the sewage to be expelled,
- at least one energising tank (23) operatively active on said treatment circuit (2), said energising tank (23) comprising at least one inlet (24) fluidically communicating with circuit (2) inlet (3) and at least one discharge outlet (25) fluidically communicating with at least the outlet (4) of the treatment circuit (2),
- at least one energising device (27a) associated to said energising tank (23) and configured to transfer energy to the sewage present inside the latter for promoting the formation of gases comprising nitrogen, preferably ammonia, energising device (27a) comprising at least one selected in the group comprising:
  - an ultrasound generator (27),
  - a microwave generator (9a),
  - an electrolytic cell (8),
- at least one gas recovering circuit (10) fluidically communicating with the energising tank (23) for receiving said gases,
- at least one refining tank (32) comprising:
  - a lower zone (32a), suitable for receiving a liquid phase acid solution (A), and an upper zone (32b), positioned above and fluidically communicating with said lower zone (32a) and suitable for receiving a gaseous step,
  - at least one gas inlet (33), positioned in proximity with a bottom of said refining tank (32) and suitable for fluidically communicating the lower zone (32a) to the gas recovering circuit (10),
  - at least one gas outlet (34) positioned at a top zone of refining tank (32) and suitable for fluidically communicating the upper zone (32b) to a gas outlet line (35),
  - wherein acid solution (A) is configured to determine, following a contact with gases arriving from inlet (33):
    - the salification of ammonia present in said gases with $H^+$ ions of said acid solution (A),
    - the generation of a first purified gas flow comprising nitrogen, preferably ammonia, in a percentage smaller than the percentage of nitrogen, preferably ammonia, present in gases entering refining tank (32),
  - said refining tank (32) comprising at least one filtration element (37) positioned in the upper zone (32b), said filtration element (37) being configured to intercept first purified gas flow and enable to form a second purified gas flow comprising a nitrogen percentage, preferably ammonia, lower than the nitrogen percentage, preferably ammonia, present in the first purified gas flow.

In an 87th aspect according to the preceding aspect, apparatus comprises a plurality of consecutive refining tanks (32) and fluidically communicating to each other, configured to obtain purified gases having lower and lower ammonia contents.

In an 88th aspect according to aspect 86th or 87th, acid solution (A) comprises at least one of:
- a diluted solution of sulphuric acid and distilled water;
- sulphuric acid.

In an 89th aspect according to the preceding aspect, acid solution (A) comprises at least sulphuric acid and distilled water, the percentage of sulphuric acid in the acid solution (A) is greater than or equal to the distilled water percentage present in the acid solution, particularly wherein the ratio of sulphuric acid percentage to distilled water percentage present in acid solution is greater than 1, particularly greater than 1.5.

In a 90th aspect according to anyone of the preceding aspect from 86th or 89th, filtration element (37) comprises a recovery plate (38) having a lower surface with an arched profiled showing a concavity facing the lower zone (32a).

In a 91st aspect according to anyone of aspects from 86th to 90th, energising device comprises an ultrasound generator (27) suitable for generating ultrasonic waves at a frequency greater than 20 kHz, particularly comprised between 25 kHz and 45 kHz, still more particularly between 30 kHz and 35 kHz.

In a 92nd aspect according to anyone of aspects from 86th to 91st, energising tank (23) comprises a gas inlet (28) to energising tank (23), said gas inlet (28) being substantially positioned at the bottom of second tank (23), said apparatus (1) comprising a blowing device (29) fluidically communicating with gas inlet (28) of second tank (23) suitable for blowing at least one gas into the latter.

In a 93rd aspect according to the preceding aspect, gas blown in energising tank comprises air, particularly oxygen and/or ozone.

In a 94th aspect according to the preceding aspect, blowing device (29) comprises at least one compressor (30).

In a 95th aspect according to anyone of aspects from 86th to 94th, energising tank (23) defines a compartment having a volume comprised between 0.25 m³ and 10 m³, particularly comprised between 0.5 m³ and 5 m³, still more particularly comprised between 1 m³ and 3 m³.

In a 96th aspect according to anyone of aspects from 86th to 95th, energising tank (23) comprises a gas outlet (31) substantially positioned at the top of the latter, said gas outlet (31) fluidically communicating second tank (23) to gas recovering circuit (10) to enable the gases containing at least ammonia, to pass from second tank (23) to gas recovering circuit (10).

In a 97th aspect according to anyone of aspects from 86th to 96th, apparatus comprises:
- at least one pre-treatment tank (5) operatively active on said treatment circuit (2) and located upstream energising tank (23), said pre-treatment tank (5) comprising at least one inlet (6) fluidically communicating with circuit (2) inlet (3), and at least one discharge outlet (7) fluidically communicating with energising tank (23) inlet (23),
- at least one pre-treatment device (8a) associated to the pre-treatment tank (5) and configured to transfer energy to sewage present inside the latter (5) for promoting the formation of gases comprising nitrogen, preferably ammonia.

In a 98th aspect according to the preceding aspect, pre-treatment device (8a) is configured to subject the sewage, present inside the pre-treatment tank (5), to at least one treatment selected in the group comprising:
- a temperature raising treatment,
- an ultrasound treatment,
  said pre-treatment device (8a) being configured to enable the oxidation of sewage and promote the dissociation of gases comprising nitrogen, preferably ammonia.

In a 99th aspect according to aspect 97th or 98th, pre-treatment device (8a) comprises at least one electrolytic cell having at least one pair or electrodes (11) at least partially contacting sewage present in pre-treatment tank (5), said electrolytic cell (8) further comprising at least one electric power generator (12) connected to the pair of electrodes (11) and configured to transfer electric power to the latter.

In a 100th aspect according to aspect 97th or 98th or 99th, pre-treatment device comprises at least one microwave generator (9*a*), for example a magnetron, configured to irradiate sewage present in pre-treatment tank (5).

In a 101st aspect according to anyone of aspects from 97th to 100th, pre-treatment device (8*a*) comprises at least one blowing device (9*b*) configured to introduce air in sewage present in pre-treatment tank (5), the air introduced by blowing device (9*b*) having a temperature greater than the temperature of sewage to be treated.

In a 102nd aspect according to anyone of aspects from 86th to 101st, first tank (5) comprises at least one recirculating device (5*a*) having:
- an auxiliary tank (13),
- an inlet branch (14) to the auxiliary branch suitable for enabling to withdraw sewage from first tank (5), and
- an outlet branch (15) from auxiliary branch suitable for enabling to reintroduce sewage inside first tank (5).

In a 103rd aspect according to the preceding aspect, auxiliary tank (13) of recirculating device (5*a*) is positioned outside first tank (5), inlet branch (14) of auxiliary tank (13) being configured to withdraw sewage present in first tank (5) substantially at the bottom of the latter, outlet branch (15) of auxiliary tank (13) being configured to reintroduce sewage in first tank (5) substantially at or above a maximum reachable level of sewage in first tank (5).

In a 104th aspect according to aspects 102nd or 103rd, at least one between electrolytic cell (8) and said microwave generator (9*a*) is active at the recirculating device (5*a*).

In a 105th aspect according to anyone of aspects from 100th to 104th, auxiliary tank (13) has inside at least one choke (16) suitable for defining a first passage (17) of the sewage circulating in said auxiliary tank (13).

In a 106th aspect according to the preceding aspect, auxiliary tank (13) comprises a plurality of chokes (16) each of them defines a respective forced passage (17) of the sewage circulating in said auxiliary tank (13).

In a 107th aspect according to aspect 105th or 106th, apparatus comprises at least one microwave generator (9*a*), for example a magnetron, outwardly engaged to the auxiliary tank (13), substantially at least at a forced passage (17), and configured to generate electromagnetic waves in the direction of the latter, and wherein auxiliary tank (13) comprises at said forced passage (17), at least one window (18) radio-transparent to said electromagnetic radiation.

In a 108th aspect according to anyone of aspects from 86th to 107th, apparatus comprises at least one sewage stirring device (20) associated to pre-treatment tank (5) and configured to move sewage present inside the latter.

In a 109th aspect according to the preceding aspect, stirring device (20) comprises at least one helix (21) at least partially immersed in sewage present inside the pre-treatment tank (5), said stirring device (20) further comprising at least one motor (22) connected to helix (21) and configured to rotate the latter in order to move sewage present in pre-treatment tank (5).

In a 110th aspect according to anyone of aspects from 86th to 109th, pre-treatment tank (5) defines a compartment having a volume greater than 0.5 m$^3$ particularly between 1 m$^3$ and 40 m$^3$, still more particularly comprised between 1 m$^3$ and 10 m$^3$.

In a 111th aspect according to anyone of aspects from 97th to 110th, said auxiliary tank (13) defines inside a compartment having a volume greater than 0.25 m$^3$, particularly comprised between 0.5 m$^3$ and 10 m$^3$, still more particularly comprised between 1 m$^3$ and 5 m$^3$, and wherein the ratio of the first tank (5) compartment volume to the auxiliary tank (13) compartment volume is greater than 1, particularly greater than 2, still more particularly greater than 3.

In a 112th aspect, it is provided an apparatus for treating sewage, comprising:
- at least one tank (13),
- at least an inlet branch (14) to tank (13),
- at least an outlet branch (15) from tank (13),
- at least one microwave generator (9*a*) suitable for subjecting the sewage, present inside tank (13), to at least a temperature raising treatment,
- at least one cooling circuit (19) of microwave generator (9*a*),
- at least one blowing device (9*b*) connected to tank (13), said blowing device (9*b*) being connected to a cooling circuit (19) outlet (26), and supplying heated gas from the latter to tank (13).

In a 113th aspect according to the preceding aspect, apparatus comprises at least one electrolytic cell (8) associated to tank (13) and having:
- at least one pair or electrodes (11) extending inside the volume defined by tank (13), and configured to at least partially contact said sewage,
- at least an electric power generator (12) connected to said pair of electrodes (11),
- the electrolytic cell being configured to energise at least a portion of sewage present inside tank (13) and promote the oxidation and/or reduction of organic matter of said sewage by electrolysis.

In a 114th aspect according to aspect 112nd or 113rd, microwave generator (9*a*) comprises at least one magnetron (9*a*) configured to irradiate sewage present in tank (13) by at least partially executing the temperature raising treatment.

In a 115th aspect according to the preceding aspect, microwave generator (9*a*) is configured to irradiate fluid with electromagnetic waves having a frequency greater than 1 GHz, particularly comprised between 1 and 3 GHz, still more particularly comprised between 2.3 and 2.6 GHz.

In a 116th aspect according to anyone of aspects from 112nd to 115th, tank (13) has inside at least one choke (16) suitable for defining at least one forced passage (17) of the sewage circulating in said tank (13), particularly wherein tank (13) comprises a plurality of chokes (16), each of them defining a respective forced passage (17) of sewage circulating in said tank (13).

In a 117th aspect according to the preceding aspect, forced passages (17) have a height, measured perpendicularly to the advancement direction of sewage, comprised between 15 mm and 60 mm, particularly comprised between 20 mm and 50 mm, still more particularly comprised between 25 mm and 45 mm.

In a 118th aspect according to anyone of the preceding aspects from 112nd to 117th, apparatus comprises at least one among said microwave generator (9*a*) and said electrolytic cell (8) is engaged at forced passage (17) and is configured to energise sewage passing through said forced passage (17).

In a 119th aspect according to anyone of aspects from 114th to 118th, microwave generator (9*a*) is outwardly engaged to tank (13), substantially at at least one forced passage (17), and is configured to generate electromagnetic waves in the direction of the latter, and wherein tank (13) comprises, at said forced passage (17), at least one window radio-transparent to frequencies of said electromagnetic radiations (18).

In a 120th aspect according to anyone of aspects from 112th to 119th, tank (13) defines inside a compartment having a volume greater than 0.25 m³, particularly comprised between 0.5 m³ and 10 m³, still more particularly comprised between 1 m³ and 5 m³.

In a 121st aspect according to anyone of aspects from 112nd-120th, gas blown inside tank (13) by said blowing device (9b) comprises air, particularly oxygen and/or ozone.

In a 122nd aspect according to anyone of aspects from 112nd to 121st, apparatus comprises:
- at least one bypass branch (53) hydraulically connected to inlet branch (14) and outlet branch (15),
- at least one discharge outlet (54) suitable for fluidically communicating the inner volume of tank (13) to bypass branch (53),
- at least one intercepting element (55) operatively active on said discharge outlet (54) and configured to be arranged in a first operative condition, wherein said intercepting element (55) shuts off the passage of sewage through said discharge outlet (54), said intercepting element (55) being further configured to be arranged in a second operative condition wherein said intercepting element (55) enables the sewage to pass through the discharge outlet (54).

In a 123rd aspect according to anyone of aspects from 112nd to 122nd, apparatus comprises a sensor operatively active on tank (13) and at least one control unit (49) connected to said sensor, said control unit being configured to:
- receive at least one signal from sensor,
- process said signal for determining at least one parameter based on the sewage circulating inside said tank (13), for example sewage pressure and/or temperature.

In a 124th aspect according to the preceding aspect, control unit (49) is configured to establish, following the reception of the signal from sensor, the existence of a clogged condition of tank (13), control unit (49) being connected to intercepting element (55) and being configured to supply a command signal for commanding the first or second condition of the latter, said control unit (49) being configured to position intercepting element (55) in second operative condition following the presence of clogged condition of tank (13) for enabling the sewage to exit bypass branch.

In a 125th aspect, it is provided the use of an apparatus according to anyone of the preceding aspects for treating sewage, particularly sewage of animal origin.

In a 126th aspect according to the preceding aspect, blowing device (9b) supplies tank (13) with gas at a temperature greater than temperature of sewage entering tank (13), particularly greater than an average temperature of sewage present in the same tank.

In a 127th aspect according to the preceding aspect, blowing device (9b) supplies tank (13) with gas at a temperature comprised between 25° C. and 90° C., particularly between 30° C. and 85° C., still more particularly between 35° C. and 80° C.

BRIEF DESCRIPTION OF THE DRAWINGS

Some embodiments and some aspects of the invention will be described in the following with reference to the attached drawings, supplied only in an exemplifying and non limiting way, wherein:

FIG. 5 particularly shows a component of the apparatus outlined in FIG. 4;

FIG. 5A particularly shows an embodiment variant of the component of apparatus in FIG. 4;

DETAILED DESCRIPTION

Apparatus for Treating Wastewater Comprising Sewage

Figure 1:
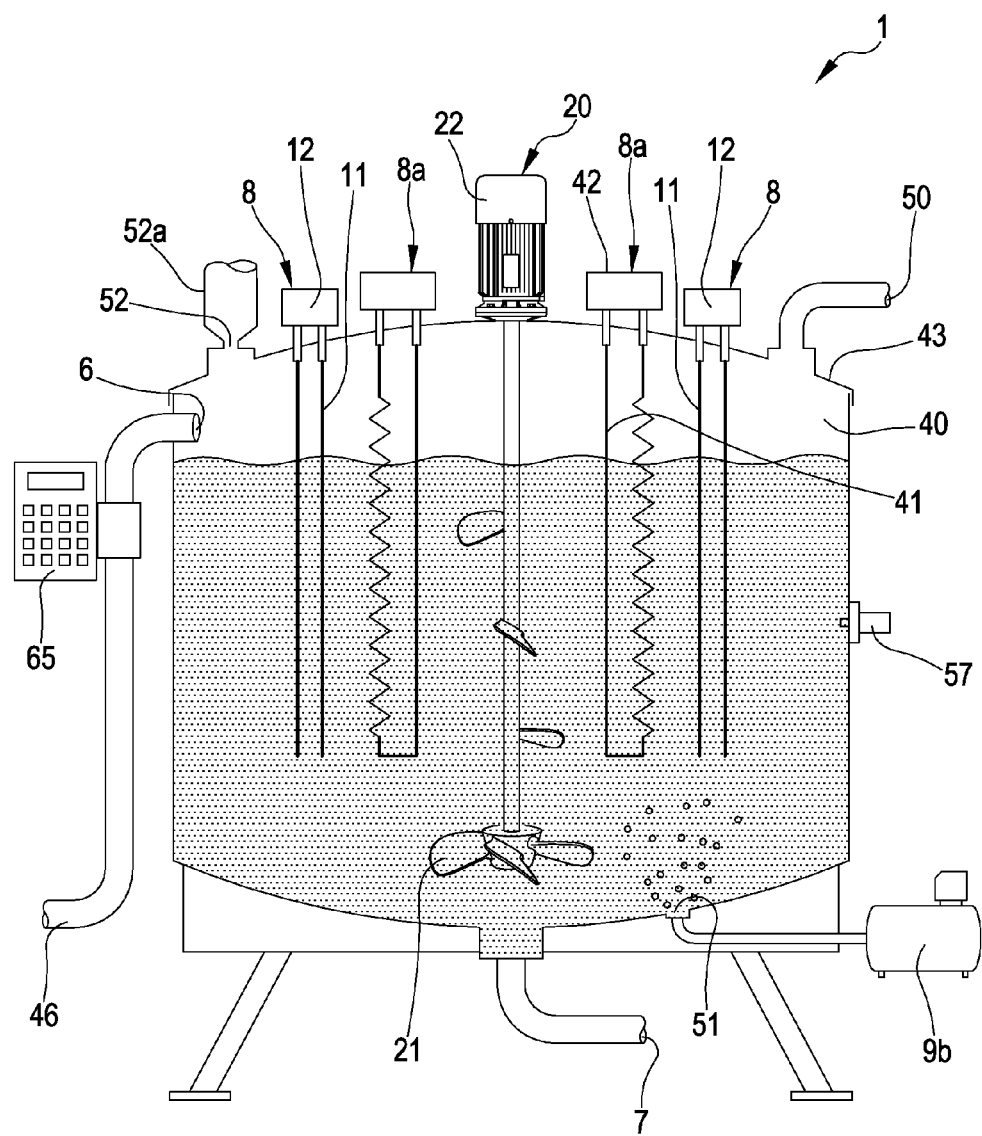
FIG. 1 schematically shows in a non limiting way a first embodiment of an apparatus for treating sewage.

Referring to attached drawings, 1 generally shows an apparatus for treating sewage. Such apparatus 1 can be applied for example in the zootechnical field for treating sewage from a breeding farm. More generally, apparatus 1 can be used in the agricultural and/or industrial and/or residential fields for treating (purifying) wastewater and/or corresponding sludge.

In the following description, it will be made reference, in a non limiting way, to the treatment of sewage: however, the present apparatus 1 use is not exclusively limited to the treatment of zootechnical sewage (it is not excluded the use of apparatus for treating residential, industrial, and urban wastewater).

Before describing apparatus 1, it is advantageous to specify that the substances to be treated contain large amounts of nitrogen N present under all its forms (chemical compositions).

The nitrogen bond with further elements can generate toxic and polluting compounds. Particularly, when nitrogen is bonded to oxygen, it is possible to obtain oxides of ammonium (for example $NO_2$) which is an extremely toxic gas. When nitrogen is bonded to hydrogen, it is possible to obtain, for example, ammonia ($NH_3$), which is a compound extremely toxic for all the living beings or living organisms.

Apparatus 1 is configured to enable to extract nitrogen present in sewage (alternatively in wastewater) for example as ammonia, $NH_4^+$ ions, nitrogen oxides or as an organic form; apparatus 1 is capable of ensuring the abatement of nitrogen contained in the wastewater (varying based on the type of wastewater and concentration of the suspended and/or dissolved substances) in order to reduce in this way their polluting capability. Preferably, apparatus 1 is configured to enable to extract ammonia (ammonia nitrogen $NH_3$ as a gas) dissolved in sewage (for example as $NH_4^+$ ions); apparatus 1 is capable of ensuring the abatement of ammonia nitrogen contained in wastewater (varying based on the wastewater type and concentration of suspended and/or dissolved substances) in order to reduce the polluting capability and ensuring, for example, its reuse.

Apparatus 1 comprises a treatment circuit 2 suitable for enabling to withdraw and discharge sewage; circuit 2 comprises an inlet 3 (defining the sewage entering point) fluidically communicating with an outlet 4 from which the treated sewage is expelled.

Treatment circuit 2 comprises a loading connection or port 2a hydraulically connectable to a sewage source S (alternatively, to water sources whose quality has been impaired by residential, industrial, or agricultural activities) such as for example basins, reservoirs and/or the like. Connection 2a substantially defines inlet 3 of treatment circuit 2, provided for withdrawing sewage from source S and transferring it to different components of apparatus 1, which will be better illustrated in the following of the present description.

Figure 6:
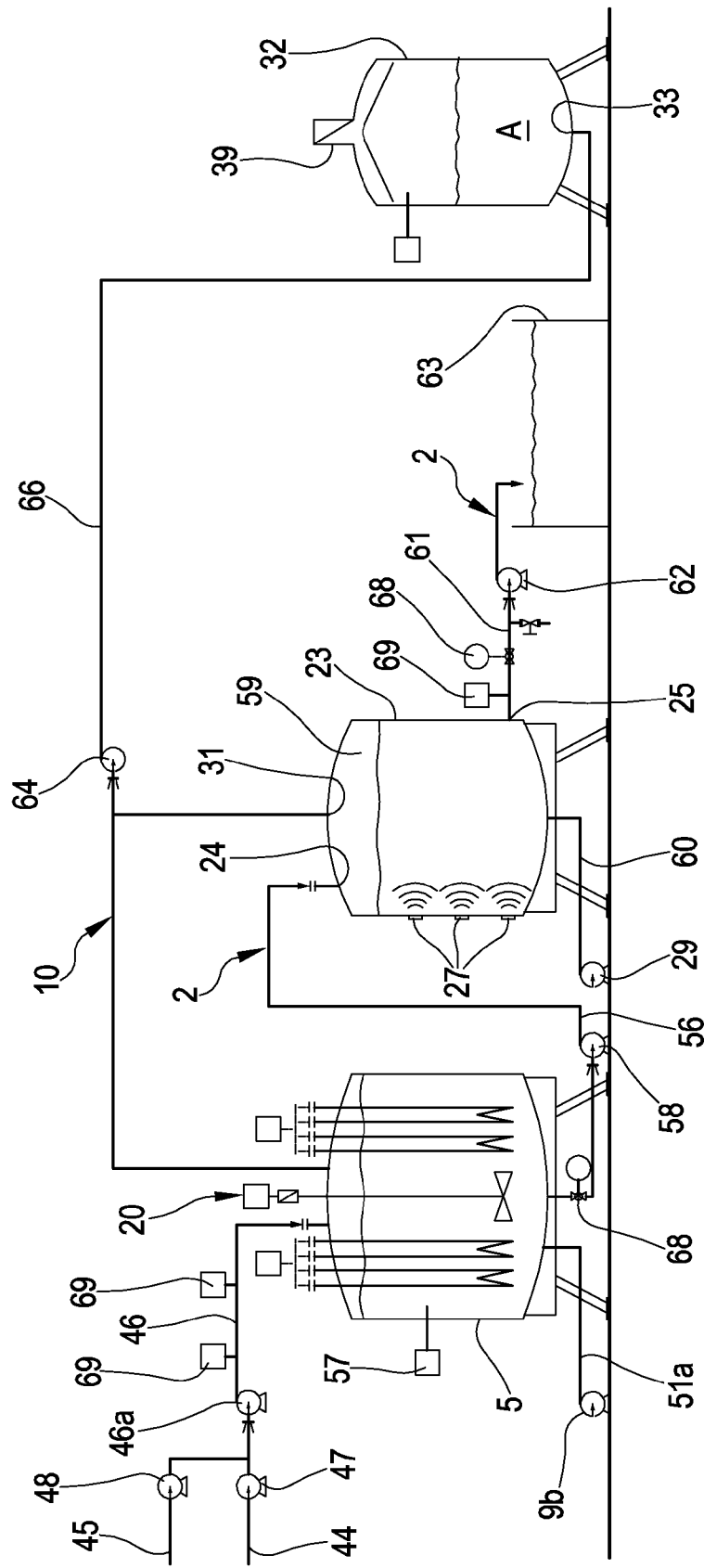
FIG. 6 schematically shows in a non limiting way a sixth embodiment of apparatus for treating sewage.
Figure 9:
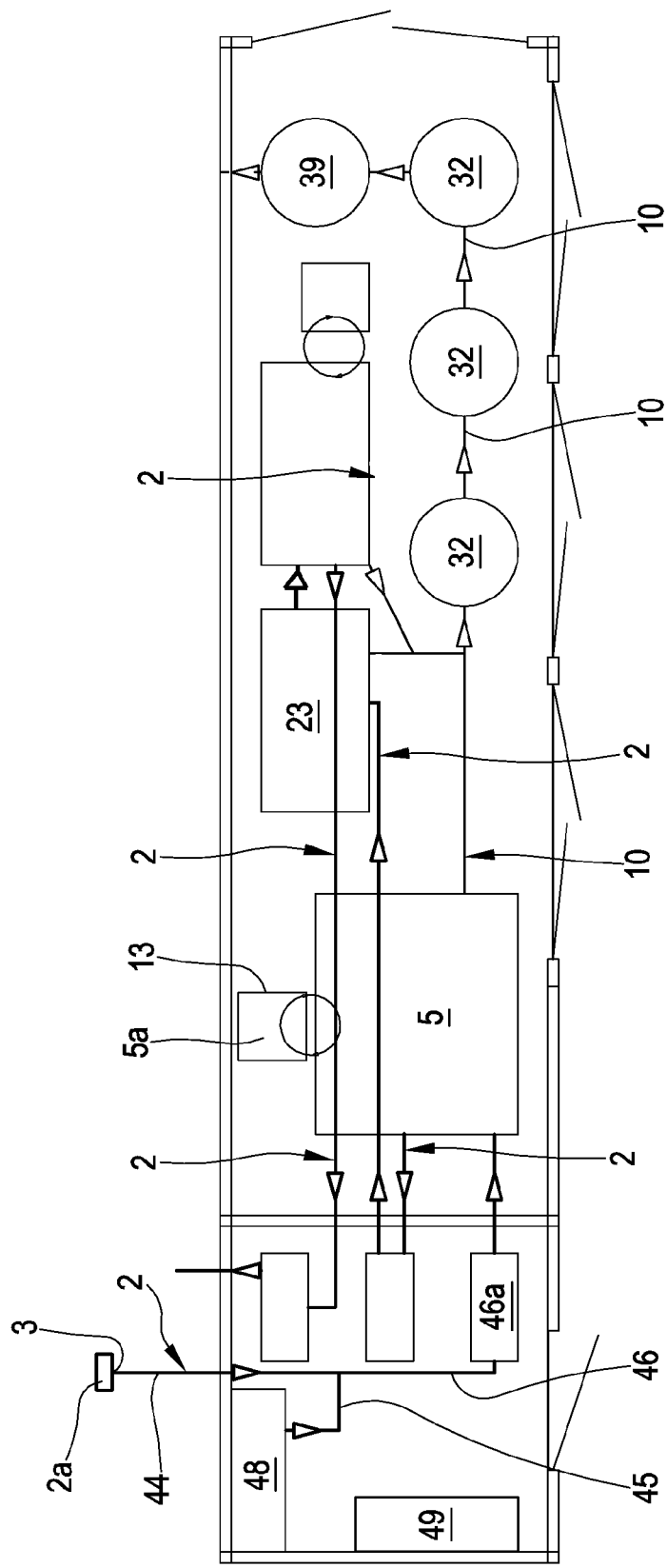
FIG. 9 schematically shows in a non limiting way an eighth embodiment of apparatus for treating sewage.

As it is shown in FIGS. 6 and 9, treatment circuit 2 comprises at least one sewage withdrawing line 44 hydraulically connected to connection 2a (fluidically communicating with inlet 3 of treatment circuit 2) and consequently to sewage source S. Treatment circuit 2, comprises in a non limiting way, a feeding line 45 hydraulically connected to a water source.

Sewage withdrawing line 44 and feeding line 45 merge in an inlet line 46. As it is schematically shown in FIG. 6, both withdrawing line and feeding lines are respectively provided with a first and second pumps 47, 48 configured to enable to respectively withdraw sewage and water and configured to feed both to the inlet line 46 of circuit 2. The water introduction in treatment circuit 2 enables both to dilute sewage (due to the introduction of water it is obtained a more liquid and homogeneous mixture than the source sewage) and rinse (clean) treatment circuit 2.

The viscosity of the fluid to be treated affects the capacity of the liquid to release dissolved gases, particularly the greater the viscosity of the liquid to be treated, the greater the resistance of the same to the gas release. Actually, the sewage "diluting" action enables to optimize the treatment of the same in order to increase the capacity of the sewage of releasing gases (viscosity reduction).

Moreover, sewage passing through treatment circuit 2 can cause scaling formations inside the latter with a consequent clogging of the passage sewage lines. The sewage capacity of scaling the passage lines is substantially based on the viscosity of the latter: the greater the viscosity of sewage, the greater the capacity of the latter to clog the treatment circuit 2. The rinsing step (cleaning of the treatment circuit) will be better described in the following.

Figure 8:
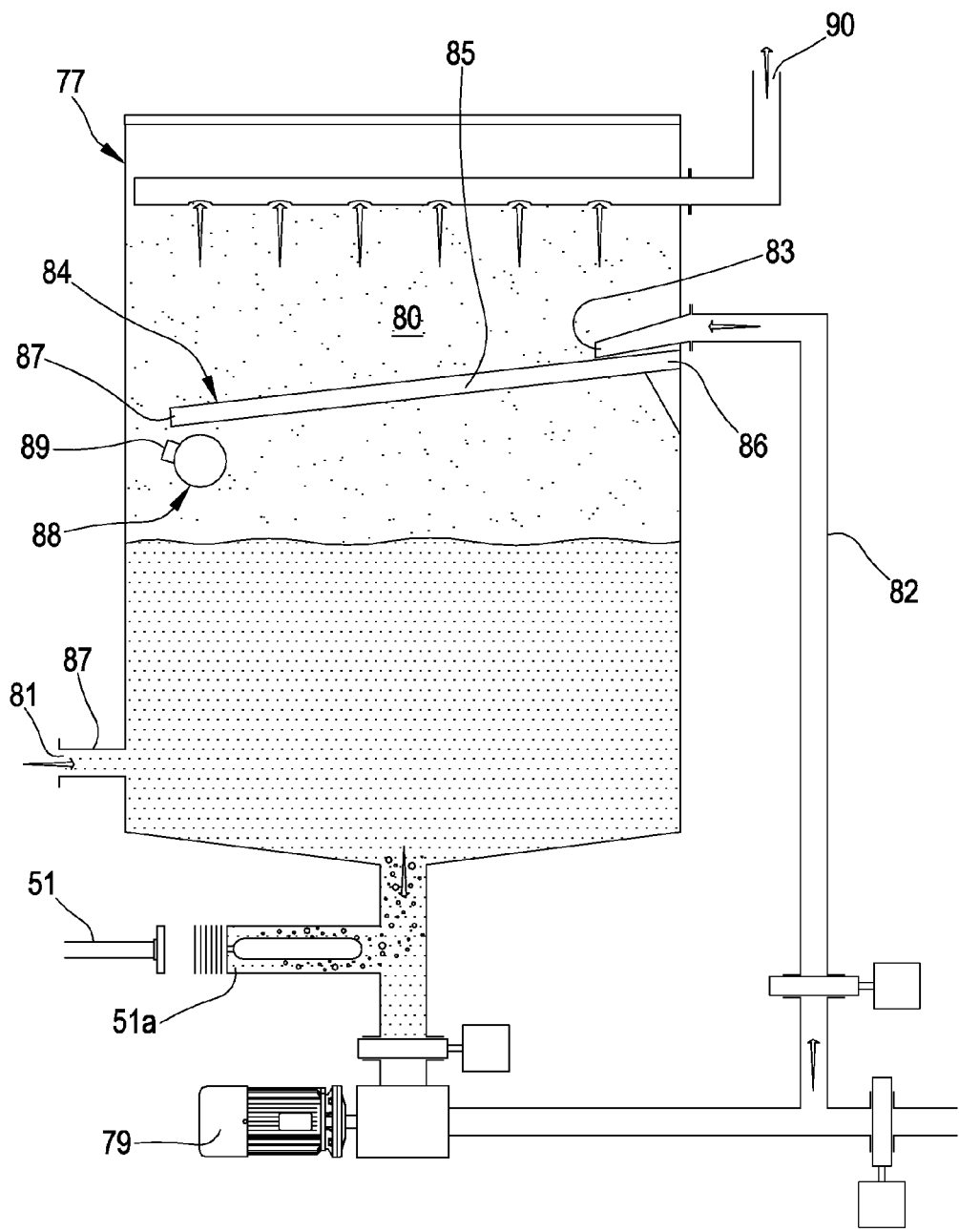
FIG. 8 schematically shows in a non limiting way a seventh embodiment of apparatus for treating sewage.

As shown in FIG. 8, apparatus 1 can be provided with at least one control unit 49 at least connected to pumps 46a, 47, 48. Control unit 49 is configured to manage said pumps for arranging them in an operative and stoppage conditions: in this way control unit 49 manages the sewage and water withdrawal from the corresponding sources and the feeding of the mixtures through the inlet branch 46.

Control unit 49 can be configured to manage, by the control of the first and second pumps 47, 48, the dilution level of sewage and/or the circuit 2 rinsing. For example, control unit 49 can be configured to manage the fed fluid flow rate of first and second pumps 47, 48 and/or manage the ratio of water amount to sewage amount.

As it is shown in FIG. 6, apparatus comprises, in a non limiting way, a pump 46a operative on inlet line 46, configured to receive the sewage and water mixture from withdrawing and feeding lines 44, 45 and feed it to a first or pre-treatment tank 5.

As it is shown in the FIG. 6 outline, apparatus 1 can comprise at least one or more valves 68 arranged on lines 44, 45 and 46 suitable for shutting off the liquid passing through both lines. Moreover, apparatus can comprise one or more control sensors 69 (for example a temperature sensor and/or a pressure sensor) operatively active on lines 44, 45 and 46, configured to detect, for example, the temperature and/or pressure of the liquid circulating inside the latter.

First or pre-treatment tank 5 is operatively active on treatment circuit 2 and is configured to receive the sewage and water mixture from inlet line 46.

From a structural point of view, first tank 5 comprises, in a non limiting way, a silos having a substantially cylindrical shape and extending, in an operative condition of first tank 5, along a vertical direction.

Figure 2:
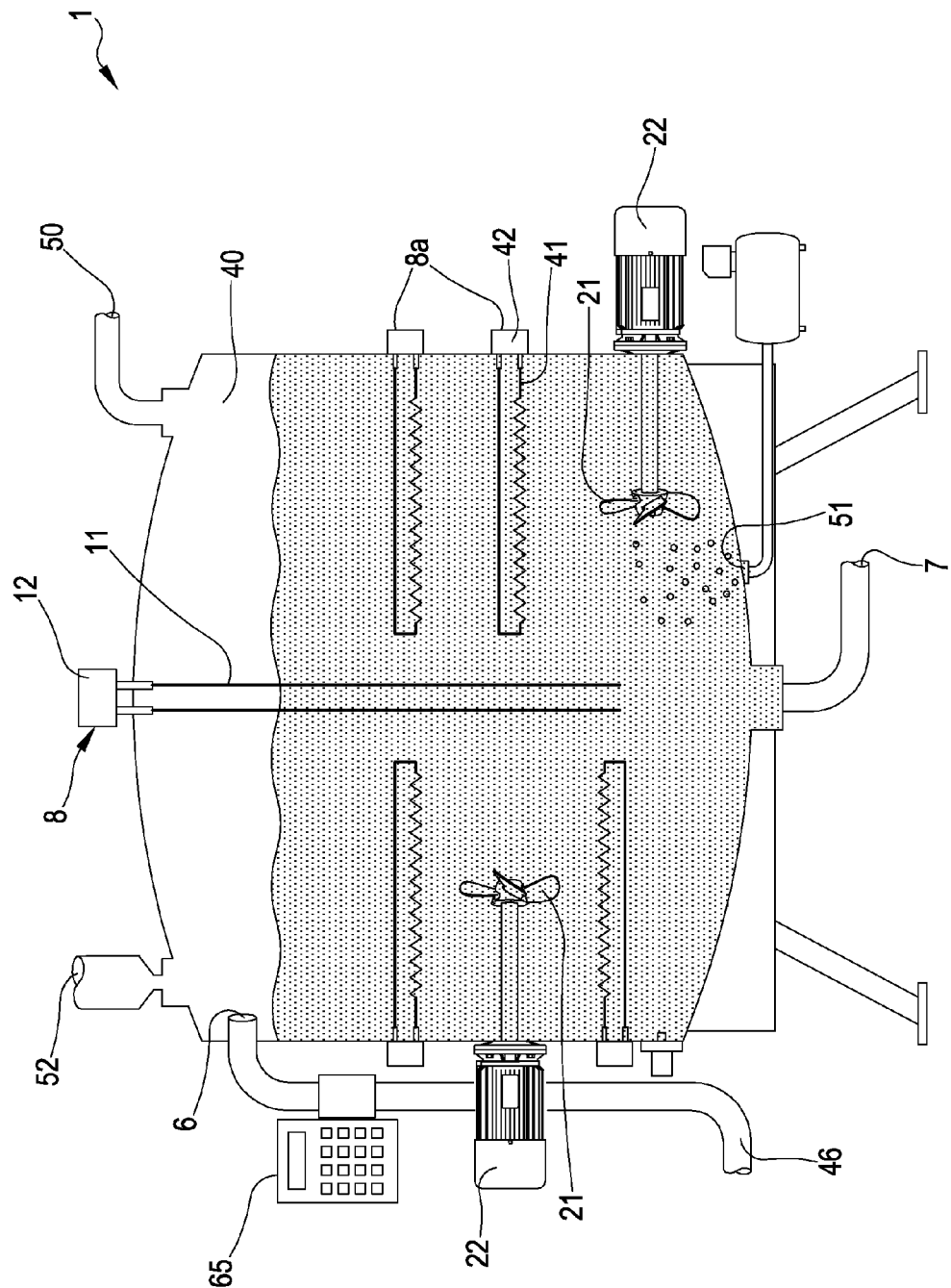
FIG. 2 schematically shows in a non limiting way a second embodiment of apparatus for treating sewage.
Figure 3:
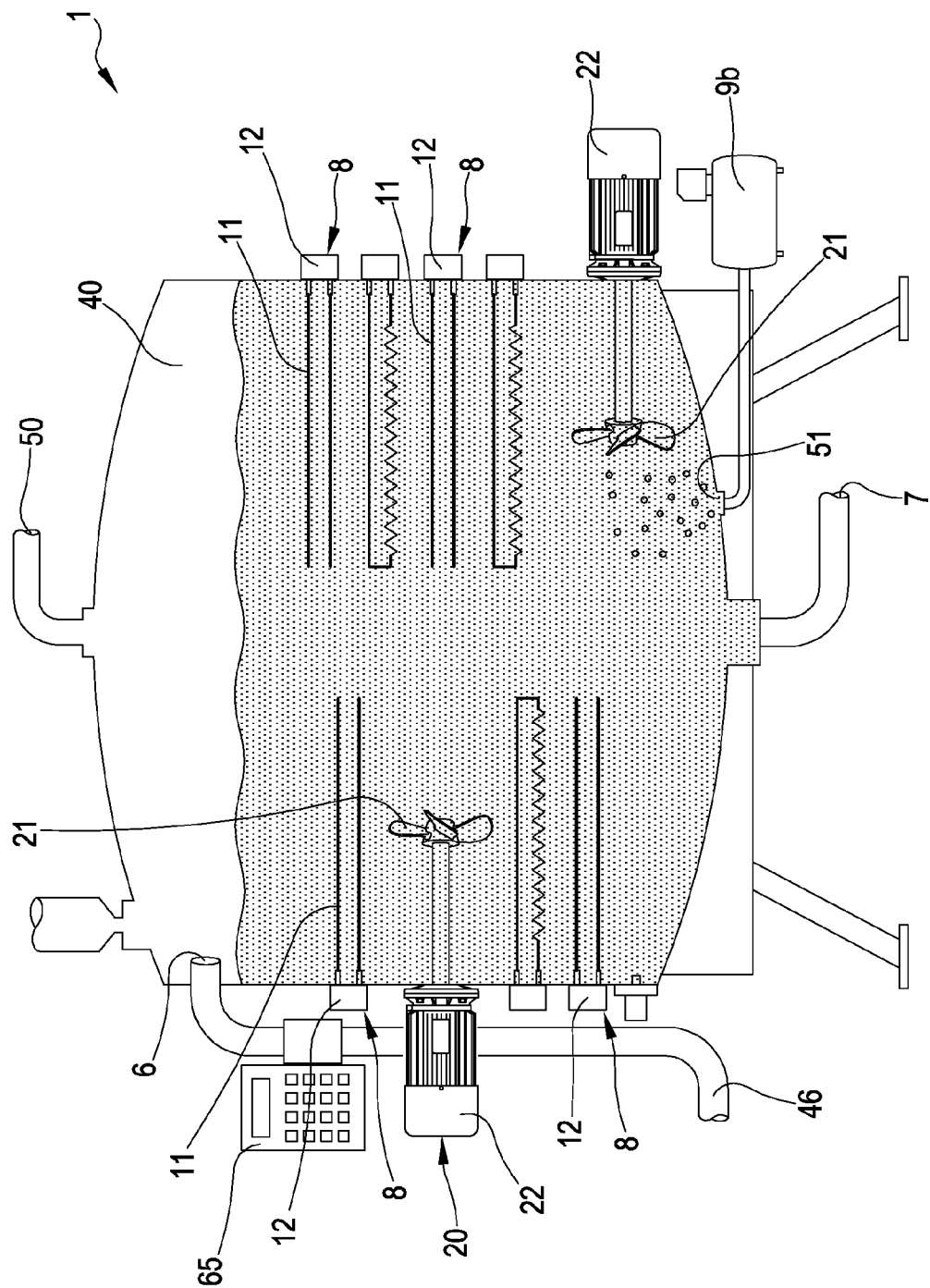
FIG. 3 schematically shows in a non limiting way a third embodiment of apparatus for treating sewage.
Figure 4:
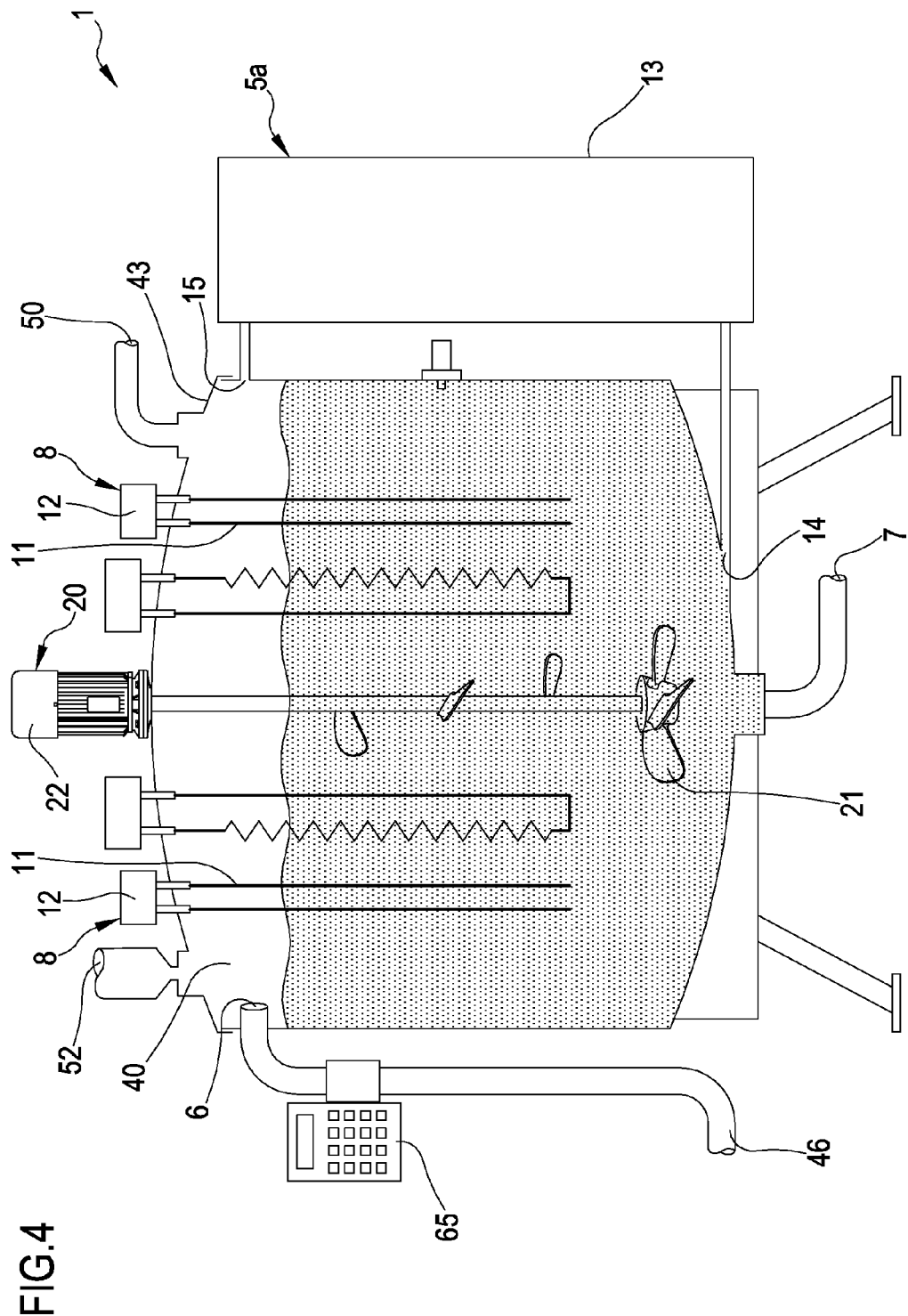
FIG. 4 schematically shows in a non limiting way a fourth embodiment of apparatus for treating sewage.
Figure 4A:
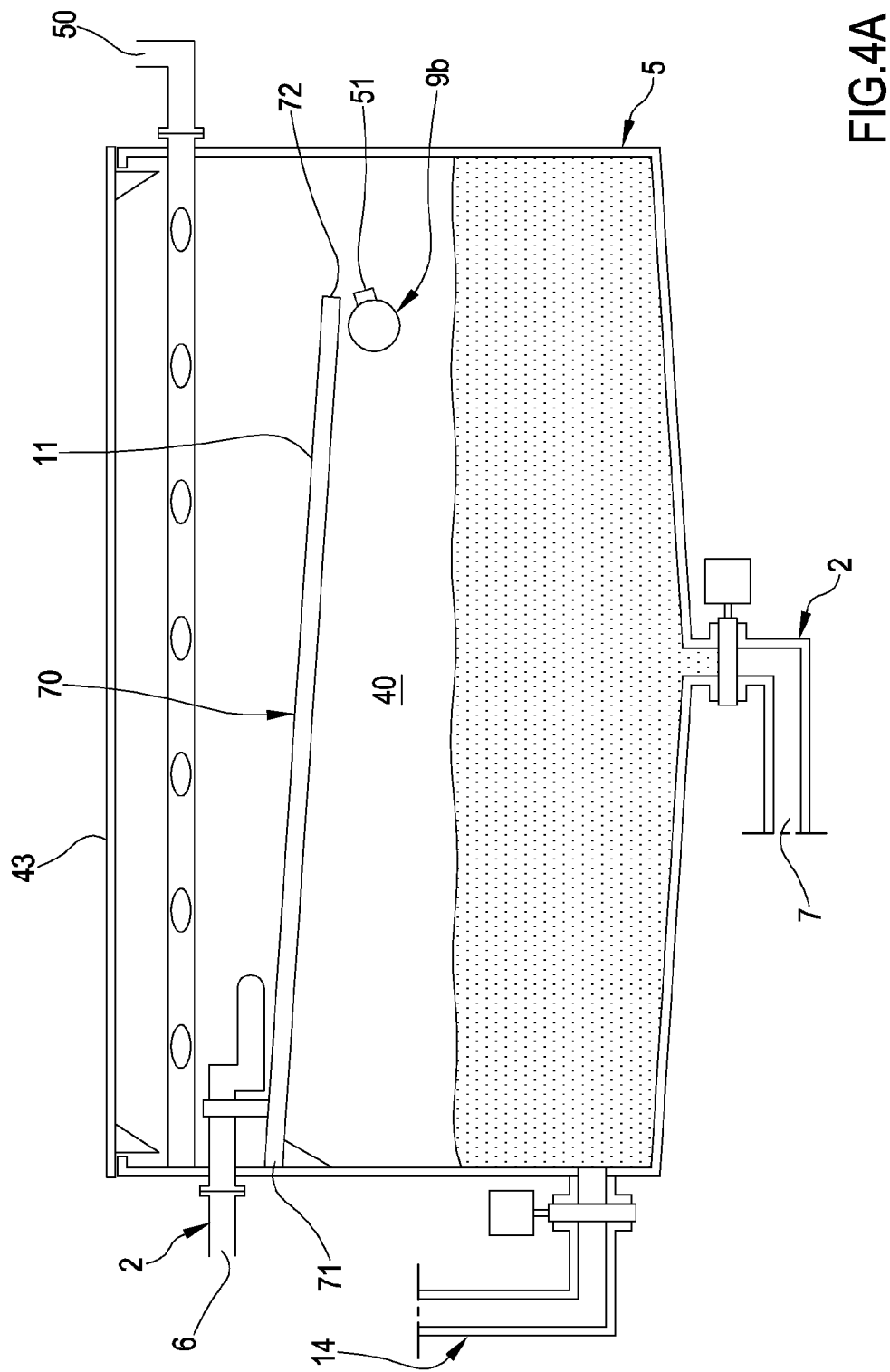
FIG. 4A schematically shows in a non limiting way a fifth embodiment of apparatus for treating sewage.

FIGS. 1-4 show a preferred arrangement of first tank 5 having a cylindrical shape (silos) while FIG. 4a shows, in a non limiting way, an embodiment variant of the first tank 5 having a parallelepiped shape extending, in an operative condition of first tank, mainly along a development direction substantially horizontal.

De facto, first or pre-treatment tank 5 comprises a container having a circular profile bottom wall, a side cylindrical wall perimetrally connected to bottom wall and an upper wall located on the top of side wall.

First tank 5 defines inside a compartment 40 having a volume greater than $0.8 \, m^3$, particularly greater than $10 \, m^3$, still more particularly comprised between 1 and $50 \, m^3$.

As it is for example shown in FIGS. 1-4a, first tank 5 comprises at least one inlet 6 fluidically communicating with inlet line 46 of treatment circuit 2 which enables to feed sewage (particularly sewage and water mixture) into first tank 5. The arrangement of inlet 6 on first tank 5 affects the necessary thrust provided to sewage and produced by pump 46a for enabling the latter to feed sewage inside first tank 5.

FIGS. 1-4a show a preferred condition of first tank 5, wherein inlet 6 is arranged on side wall at the top of the latter. Specifically, inlet 6 is arranged above a maximum level reachable by sewage inside first tank 5: in this way, it is possible to ensure a condition wherein, despite inside first tank 5 there is a predetermined sewage amount, the latter does not interfere with the sewage entering from inlet 6. This latter described condition enables to minimize the pump 46a power necessary for thrusting sewage. Alternatively, inlet 6 can be arranged in the upper wall of first or pre-treatment tank 5 (arrangement shown in FIG. 6).

Despite the above described arrangements regarding the position of inlet 6, are advantageous in terms of power of pump 46, it is not excluded the possibility of arranging inlet 6 in the bottom wall of first tank 5.

As it is shown in FIGS. 1-4a, first tank 5 further comprises at least one sewage discharge 7 (sewage and water mixture) outlet 7 fluidically communicating with outlet 4 of treatment circuit 2. Discharge outlet 7, in contrast with inlet 6, is advantageously located in the bottom wall of first or pre-treatment tank 5 for enabling an easy and fast expulsion of sewage contained in the latter.

As previously said, apparatus 1 is configured to treat sewage in order to extract from the latter dissolved gases comprising nitrogen, particularly ammonia (polluting gases made of organic matter). First tank 5 comprises at least one gas outlet 50 fluidically communicating with at least one gas treatment circuit 10 in order to enable the gases to be released from sewage. Advantageously, gas outlet 50 is arranged in the first tank 5 top, particularly is arranged in the top wall of the latter (see for example FIGS. 1-4a).

As it is shown in the attached figures, first tank 5 comprises, in a non limiting way, a first and second gas inlets 51, 52 configured to enable to feed gases, particularly air, inside first or pre-treatment tank 5.

More in detail, first inlet 51 is positioned, in a non limiting way, in the bottom wall of first tank 5 for enabling to feed air, particularly oxygen and/or ozone, into the latter. Inlet 51 position enables air to contact sewage present inside first tank. Air, particularly oxygen and/or ozone, fed from inlet 51 enables to oxidize sewage and promote the dissociation from the latter of gases comprising nitrogen, preferably ammonia. Besides the sewage oxidation, air fed to first inlet 51 supports the release of gases from sewage through gas outlet 50.

As it is shown in FIG. 6, first inlet 51 fluidically communicates with first gas feeding line 51a which, in turn, fluidically communicates with a blowing device 9b. The attached figures show a preferred embodiment wherein first gas feeding line 51a fluidically communicates with the outer environment. Blowing device 9b comprises a compressor 30 configured to withdraw air from outer environment and enable to blow it inside first or pre-treatment tank 5.

Instead, with reference to second gas feeding inlet 52, it is located, in a non limiting way, in the top wall of first tank 5 (see for example FIG. 4) for enabling to feed air inside the latter. The arrangement of second inlet 52 enables air to contact gases developed inside first tank 5 and convey them to gas outlet 50. Second inlet 52 fluidically communicates with a second gas feeding line 52a which in turn fluidically communicates with a gas source. Attached figures show a preferred embodiment wherein second gas feeding line 52a fluidically communicates with the outer environment. On second gas feeding line 52a is operatively active a compressor configured to withdraw air from the outer environment and blow it into first or pre-treatment tank 5.

Apparatus 1 comprises at least one energising device configured to transfer energy to sewage and promote the dissociation of gases in order to enable the dissociation of said gases comprising nitrogen, preferably ammonia, in first tank 5.

FIGS. 1-4a show different arrangements of first tank 5.

Each embodiment comprises, in a non limiting way, at least one electrolytic cell 8 active on first tank 5 and comprising a pair or electrodes 11 at least partially contacting sewage present inside tank 5.

Electrolytic cell 8 is configured to energise treating fluid for promoting the dissociation from sewage at least of nitrogen for forming gases comprising the latter element, particularly ammonia.

Electrolytic cell 8, used in first tank 5, substantially acts as an energising element suitable for promoting the oxidation-reduction inside the fluid for releasing nitrogen, particularly ammonia. Effectively, electrolytic cell 8 substantially performs an inverse electrolysis process, in other words energising fluid (by applying a determined voltage across the electrodes) causes a chemical reaction in the fluid suitable for dissociating nitrogen, particularly ammonia, from said fluid.

Electrodes 11 are electrically connected to an electric generator 12 adapted to supply a determined voltage across the pair of electrodes 11. Generator 12 has an electric power comprised between 1 and 20 kW, still more particularly comprised between 5 and 15 kW.

Such generator enables to define inside the fluid an electric current greater than 4 Ampere, particularly comprised between 4 and 25 Ampere, still more particularly comprised between 5 and 20 Ampere.

The amount of electric current passing through the fluid depends on the quantity and intensity of a salt bridge formed by the oxidation-reduction reaction in the fluid, which causes the dissociation of gases comprising nitrogen, particularly ammonia.

Embodiment in FIG. 1 comprises, in a non limiting way, two electrolytic cells 8 each of them is associated to the top wall of tank 5. Besides the electrolytic cells 8, first tank 5 in FIG. 1 is provided with, in a non limiting way, a pair of resistors 41 which are engaged to the tank 5 upper wall and electrically connected to an electric generator 42. Resistors and generator 41, 42 are configured to transfer thermal energy to sewage, in other words heat the latter in order to promote the dissociation of gases comprising nitrogen, preferably ammonia. Besides that, heating sewage enables to make homogeneous the sewage mass which in turn enables to increase the dissociating action of electrolytic cells 8.

Apparatus 1 comprises, in a non limiting way, a stirring device 20 which is also engaged to the tank 5 upper wall. Stirring device 20 comprises a motor 22 engaging a helix 21 at least partially contacting the sewage present in first tank 5. Stirring device 20 is configured to move sewage present in first tank 5 in order to promote its homogenization.

In the embodiment shown in FIG. 1, first tank 5 comprises, in a non limiting way, a plug 43 defining the tank 5 upper wall and for example removably engaged to tank 5. As it is shown in FIG. 1, plug 43 firmly supports the inlet 52, electrolytic cells 8, resistors with their corresponding generators 42, stirring device 20, and outlet 50.

The second embodiment of first tank 5, shown in FIG. 2, is substantially similar to first embodiment. In contrast to first embodiment, tank 5 is integrally made (plug 43 is not present) and just the electrolytic cell 8 is engaged to tank 5 upper wall. Electric resistors 41, with corresponding generators 42, and stirring device 20 are engaged to tank side wall. Sewage and gas inlets and outlets are arranged, in a non limiting way, as in the first embodiment.

In the third embodiment shown in FIG. 3, tank 5 has a structure substantially similar to the structure shown in second embodiment (plug 43 is not present). Inlets and outlets are effectively configured as in the previously examined embodiments. Whereas, with reference to the electrolytic cell 8, resistors 41 (with their corresponding generators 42) and stirring device 20, are engaged to the side wall of first tank 5.

The fourth embodiment, shown in FIG. 4, is substantially similar to first embodiment (arrangement of tank and configuration of the details). In the fourth embodiment, first tank 5 further comprises a recirculating device 5a suitable for circulating inside it at least a portion of sewage present in first tank 5. During the circulation step, device 5a is configured to further energise the sewage withdrawn and reintroduce it into first tank 5. Device 5a is, effectively, an element for a further treatment associated to first tank 5, which enables to increase/promote the dissociation of gases comprising nitrogen. Device 5a will be better explained in the following.

The fifth embodiment of first tank 5, shown in FIG. 4a, has, in a non limiting way, a parallelepiped shape. As with the first embodiment shown in FIG. 1, tank 5 in FIG. 4a has a plug 43 defining the tank 5 upper wall and for example removably engaged to the latter. As for the previously examined embodiments, inlet 6 is located in the tank 5 top and above a maximum level reachable by sewage, while outlet 7 is preferably positioned at the bottom wall of first tank 5.

In the fifth embodiment, first tank 5 comprises, below the inlet 6, a sloped support 70 configured to receive the sewage fed through inlet 6. Support 70 comprises, in a non limiting way, a plate having main extension direction and extending between a first end 71, constrained to tank 5, and a second end 72 suspended inside first tank 5 at a level lower than the level at which first end 71 is positioned. The level difference (slope) of the plate enables sewage from inlet 6 to flow on the latter to second end 72.

A pair of electrodes 11 of an electrolytic cell 8 is engaged on the plate: sewage flowing on plate is energised by the electrolytic cell 8 which in turn promotes the dissociation from sewage of gases comprising nitrogen.

In the embodiment of FIG. 4a, blowing device 9b is positioned at second end 72 of plate and particularly below the latter. First inlet 51 of device 9b is positioned in the direction of sewage falling from the second plate end: the air and/or nitrogen on the sewage film falling from plate causes an oxidation reaction in sewage, which in turn promotes the dissociation from the latter of gases comprising nitrogen.

As for the fourth embodiment, also in the fifth embodiment, first tank 5 further comprises a recirculating device 5a (not shown in FIG. 4a) suitable for recirculating inside it at least a portion of sewage present in first tank 5. During the recirculating step, device 5a is configured to further energise withdrawn sewage and reintroduce it into first tank 5. Effectively, device 5a is a further treatment element associated to first tank 5, which enables to increase/promote the dissociation of gases comprising nitrogen.

From a structural point of view, device 5a comprises: an auxiliary tank 13, an inlet branch 14 to auxiliary tank 13 suitable for enabling to withdraw sewage from first tank 5, and an outlet branch 15 from auxiliary tank, suitable for enabling to reintroduce sewage into first tank 5.

Auxiliary tank 13 of recirculating device 5a is positioned, in a non limiting way, outside first tank 5: inlet branch 14 of auxiliary tank 13 is configured to withdraw sewage present in first tank 5 substantially at the bottom of the latter, while outlet branch 15 is configured to reintroduce sewage in first tank 5 substantially at or above a maximum level reachable by sewage in first tank 5. Recirculating device 5a substantially forms a closed circuit for recirculating sewage present in first tank 5.

From a dimensional point of view, auxiliary tank 13 defines inside a compartment having a volume comprised between 0.1 m$^3$ and 10 m$^3$, particularly comprised between 0.2 m$^3$ and 5 m$^3$, still more particularly comprised between 0.3 m$^3$ and 1 m$^3$. The ratio of the first tank 5 compartment volume to auxiliary tank 13 compartment volume is greater than 5, particularly greater than 6, still more particularly greater than 8.

FIGS. 5 and 5A show, in a non limiting way, two different embodiments of recirculating device 5a. To the circulating device 5a is associated at least one energising device suitable for treating sewage passing from auxiliary tank 13 in order to promote the dissociation of gases comprising nitrogen, preferably ammonia.

In the embodiment of FIG. 5, auxiliary tank 13 has inside, in a non limiting way, a series of chokes 16, each of them is suitable for defining inside the auxiliary tank 13 a sewage forced passage 17.

As it is shown in the attached figures, forced passages 17 define, in a non limiting way, a substantially zigzag path: in this way forced passages alternately convey sewage at the facing side walls of auxiliary tank 13. However, it is not excluded the possibility of arranging forced passages 17, aligned along the sewage advancement direction.

FIG. 5A shows openings of forced passages 17 having, in a non limiting way, a substantially semicircular cross-section. Alternatively, forced passages 17 can have a polygonal, circular or elliptical cross-section.

At least one microwave generator 9a, for example a magnetron, is outwardly engaged to auxiliary tank 13, substantially at at least one forced passage 17. Generator 9a is configured to generate electromagnetic waves in the direction of the forced passage 17 for irradiating sewage passing from the latter. Generator 9a, as for electrolytic cell 8 and electric resistors, enables to energise the fluid in order to promote the dissociation from the latter of gases comprising nitrogen, particularly ammonia. Generator 9a has a power, expressed in kW, greater than 20 kW, particularly comprised between 20 and 100 kW, still more particularly comprised between 30 and 100 kW. Such generator 9a is configured to irradiate fluid having electromagnetic waves at a frequency greater than 1.5 GHz, particularly comprised between 1.5 and 2.5 GHz, preferably 2.45 GHz.

Each of the forced passage 17 has a height, measured perpendicularly to the sewage advancement direction, comprised between 15 mm and 60 mm, particularly comprised between 20 mm and 50 mm, still more particularly comprised between 25 mm and 45 mm. In this way, forced passage 17 generates a striction wherein sewage has a thickness equal to the forced passage 17 height. Auxiliary tank 13 comprises, at forced passage 17, at least one window 18 radio-transparent to frequencies of the electromagnetic radiation. Forced passage 17 height is sized so that the electromagnetic waves of generator 9a can completely penetrate through the fluid thickness passing through said passage: in this way it is possible to ensure the irradiation of all the material passing through the passage opening.

Window 18 is configured to enable microwave generator, arranged at said window 18, to completely irradiate the sewage flow passing through the forced passage 17: particularly, thanks to the reduced thickness of the flow passing through each forced passage and thanks to the microwave generator power, the electromagnetic radiation crosses and irradiates all the material passing through each forced passage.

FIG. 5 shows an embodiment of the recirculating device 5a wherein microwave generators 9a are, in a non limiting way, aligned along the sewage advancement direction (in this configuration, the microwave generators 9a are not present on all the forced passages).

In the embodiment of FIG. 5A, at least one microwave generator 9a is engaged at one forced passage 17. As it is shown in FIGS. 5 and 5A, circulating device 5a further engages at least one electrolytic cell 8 suitable for treating sewage passing from said auxiliary tank 13.

In the embodiment of FIG. 5, apparatus comprises, in a non limiting way, just one electrolytic cell 8 substantially positioned at the sewage outlet from auxiliary tank 13. Particularly, electrolytic cell 8 is interposed between chokes 16 and outlet branch 15 of auxiliary tank 13.

An alternative embodiment is shown in FIG. 5A, wherein it is present, for each of said forced passages 17, at least one electrolytic cell 8 adapted to energise the sewage passing through passages 17.

As it is shown in FIG. 5, recirculating device 5a comprises at least one blowing device 9b suitable for enabling to introduce gases inside auxiliary tank 13 with a following oxidation of sewage in order to promote the dissociation of gases comprising ammonia.

FIG. 5 shows a preferred embodiment of recirculating device 5a, comprising at least one cooling circuit 19 of the microwave generators 9a associated to auxiliary tank 13.

In particular, cooling device 19 is configured to withdraw environment air and generate an air flow adapted to heat the microwave generators: air flow absorbs heat from generators 9a for preventing them from overheating.

Cooling circuit 19 is configured to convey air flow through an outlet 26, positioned at the inlet branch 14 of tank 13, which introduces inside the latter, the heated air flow. In this way, it is possible to introduce into tank 13 air at a temperature comprised between 25° C. and 90° C., particularly between 30° C. and 85° C., still more particularly between 35° C. and 80° C.

The temperature of the sewage to be treated is reasonably lower than the temperature of the air flow recovered from cooling circuit 19, therefore the introduced air flow, besides enabling the oxidation of the sewage, enables to heat the latter in order to further promote the dissociation from sewage of gases comprising ammonia.

The presence of chokes 16 inside the auxiliary tank 13 can cause the clogging/stoppage of the same at at least one forced passage 17. In order to open the circulating device 5a, it is possible to provide a bypass branch 53 hydraulically connected to inlet branch 14 and outlet branch 15. Bypass branch comprises one or more discharge outlets 54 adapted to fluidically communicate the inner volume of tank 13 to the bypass branch 53. Preferably, discharge outlets 54 are positioned at one or more forced passage 17.

Each discharge outlet has at least one intercepting element 55 operatively active on discharge outlet 54 and configured to take a first operative condition wherein intercepting element 55 shuts off sewage passage through said discharge outlet 54. Intercepting element 55 is further configured to take a second operative condition, wherein intercepting element 55 enables the sewage to pass through discharge outlet 54.

If the recirculating device 5a becomes clogged, it is possible to position one or more intercepting elements 55 in the second operative condition in order to enable the sewage to pass from the bypass branch 53.

Apparatus 1 can comprise at least one sensor, for example a pressure and/or temperature and/or flow sensors, operatively active on tank 13 and connected to control unit 49; control unit 49 is configured to receive at least one sensor signal and process said signal for determining at least one parameter related to the sewage circulating inside said tank 13, for example pressure and/or temperature and/or flow rate of sewage. Control unit 49 is configured to establish, following the reception of the sensor signal, the presence of a clogging condition of tank 13; control unit 49 is connected to intercepting element 55 and is configured to send a command signal to the latter for commanding the first or second condition of the latter. Control unit 49 is configured to position intercepting element 55 in second operative condition after the clogged tank 13 condition has been determined for enabling the sewage to exit the bypass branch 53.

FIG. 4 shows a condition wherein to the first tank 5 only one recirculating device 5a is associated, alternatively two or more devices 5a can be associated to first tank 5 in order to form a series of circulations of the sewage present in tank 5.

Following the sewage advancement direction, treatment circuit 2 comprises a passage line 56 hydraulically connected, from one side, to discharge outlet 7 of first tank and, from the other side, to a second or energising tank 23.

Passage line 56 is configured to enable the sewage treated in first tank 5 and recirculating device 5a, to flow into second tank 23.

As schematically shown in FIG. 6, apparatus 1 comprises a pump 58 configured to enable the sewage to be withdrawn from first tank 5 and supply sewage to second tank 23. As for lines 44, 45, and 46, also passage line can comprise at least one valve 68 and/or control sensor communicating with control unit 49 in order to monitor and manage the flow passing through passage line 56.

Second or energising tank 23 is operatively active on treatment circuit 2 and is configured to receive sewage arriving from first tank 5.

From a structural point of view, second tank 23 comprises, in a non limiting way, a silos having a substantially cylindrical shape extending, in an operative condition of second tank 23, along a vertical direction. Effectively, tank 23 comprises a silos having a bottom wall with a circular outline, a cylindrical side wall perimetrally connected to bottom wall, and a top wall positioned on the top of side wall.

Second tank 23 defines inside a compartment 59 having a volume comprised between 0.1 m$^3$ and 15 m$^3$, particularly comprised between 0.2 m$^3$ and 10 m$^3$, still more particularly comprised between 0.25 m$^3$ and 1 m$^3$. Specifically, the ratio of the volume defined by compartment 40 of first tank 5 to volume defined by compartment 59 defined by second tank 23 is greater than 3, particularly greater than 4, still more particularly greater than 8.

As it is shown for example in FIG. 6, second tank 23 comprises at least one inlet 24 fluidically communicating with passage line 56 of treatment circuit 2, which enables the sewage to be supplied into second tank 23. As discussed in relation to first tank 5, the arrangement of inlet 24 on second tank 23 controls the thrust necessary to the sewage, delivered by pump 58 in order to enable the latter to supply the sewage into second tank 5 (energising tank). FIG. 6 shows a preferred condition of second tank 23 wherein inlet 24 is arranged on top wall of the latter. De facto, as for inlet 6 of first tank, inlet 24 is arranged above a maximum level reachable by sewage inside the second tank 23: in this way, it is possible to ensure a condition wherein, despite second tank 23 contains a predetermined sewage amount, the latter does not interfere with the sewage entering from inlet 24.

As it is shown in FIG. 6, second tank 23 further comprises at least one discharge outlet 25 of sewage (sewage and water mixture) fluidically communicating with outlet 4 of treatment circuit 2. As opposed to inlet 24, discharge outlet 25 is advantageously positioned at tank 23 bottom wall in order to enable a sewage present in the latter to be easily and quickly expelled.

As previously said, apparatus 1 is configured to treat sewage in order to extract dissolved gases comprising nitrogen (polluting gases of the organic matter), preferably ammonia. Second tank 23 comprises at least one gas outlet 31 fluidically communicating with at least the gas treatment circuit 10 in order to enable the gases to be released from sewage. Advantageously, gas outlet 31 is arranged at the top of second tank 23, particularly is arranged on the upper wall of the latter (for example, see FIG. 6).

As it is shown in the attached figures, second tank 23 comprises, in a non limiting way, a gas inlet 28 configured to enable to supply gas inside second tank 23, particularly air, still more particularly oxygen and/or ozone.

More in detail, inlet 31 is positioned, in a non limiting way, in the bottom wall of second tank 23 to enable to supply air, particularly oxygen and/or ozone, inside the latter. The arrangement of inlet 31 enables the air to act on sewage present inside second tank 23. Air, particularly oxygen and/or ozone, entering the inlet 31 enables to oxidize the sewage in order to promote the dissociation from the latter of gases comprising nitrogen, preferably ammonia. Besides the sewage oxidation, the air introduced from inlet 31 enables said gases to be released from sewage.

As it is shown in FIG. 6, inlet 31 fluidically communicates with a gas supply line 60 which in turn fluidically communicates with a blowing device 29. Attached figures show a preferred embodiment wherein gas supply line 60 fluidically communicates with the outer environment. Blowing device 29 comprises a compressor configured to withdraw air from outer environment and enable to blow the air inside second tank 23.

Apparatus 1 comprises at least a further energising device configured to transfer energy to sewage and promote the dissociation of said gases, comprising ammonia, in order to enable the dissociation of gases comprising nitrogen, preferably ammonia, in second tank 23. In particular, the energising device associated to second tank, comprises at least one ultrasound generator 27 suitable for generating ultrasonic waves at a maximum frequency greater than 20 kHz, particularly comprised between 25 kHz and 45 kHz, still more particularly between 30 kHz and 35 kHz, and preferentially a frequency of about 32.5 kHz. In a preferred embodiment, the ultrasound irradiation is performed by varying the waves frequency from a minimum frequency to the above mentioned maximum frequency: in this way it is possible to maximize the disgregating effect of ultrasound on ammonia.

De facto, an ultrasound continuous irradiation would cause a sewage stratification and would adapt the same to the treatment: in this way the sewage would be adapted at a molecular level to the ultrasonic waves so that the cavitation phenomenon inside the sewage will be reduced.

On the contrary, a continuous variation of the ultrasonic waves frequency prevents the sewage from adapting to the treatment: so that it is possible to maintain intense the fluid cavitation phenomenon.

The Applicant has observed that the ultrasound treatment, if performed after the pre-treatment step by microwaves and electrolytic cells, entails an unexpected and surprising capability to separate ammonia probably due to different factors: for example, the material homogenization and pre-treated material heating certainly promote the propagation of ultrasounds so that the cavitation phenomenon in the liquid (sewage) is boosted in comparison with a non "pre-treated" liquid.

Ultrasonic irradiation with ultrasonic wave represents the treatment at the end of which sewage is discharged as a product denatured of the ammonia nitrogen fraction. Ultrasonic irradiation generates inside the sewage a cavitation process causing, at a chemical level, conditions adapted to the passage of gas of ammonia dissolved in water to a gas state. The process can be defined as an "sonic-chemical" process: the aim consists of forming as small as possible cavitation bubbles in order to boost the ammoniacal gases transfer to the surface of the basin so that they can be sucked. This step can be made more effective by means of the preceding pre-treatment actions.

Treatment circuit 2 comprises a discharge line 61 hydraulically connected to discharge outlet 25 of second tank 23. Discharge line 61 enables to expel treated sewage from treatment circuit 2. In the embodiment of FIG. 6, on discharge line 61 is active a pump 62 adapted to withdraw treated sewage from second tank 23 and supply it, for example, to a collection basin 63.

It is useful to specify that both tanks (first and second tanks 5, 23) do not comprise any type of systems supplying vapours or gases in the atmosphere, thanks to the presence of hoods collecting vapours conveyed in forced conduits.

In the preferred embodiment of apparatus 1, first and second tanks 5, 23 are substantially distinct from each other and are connected to each other by means of passage line 56. Alternatively, first and second tanks 5, 23 are united to each other so that they define just one tank.

Further, apparatus 1 can comprise an oxidation tank 77 schematically shown in FIG. 8, fluidically communicating with second tank 23 and which is suitable for receiving sewage exiting from the latter.

In particular, it is possible to provide an oxidation line 78 hydraulically connected to discharge line 25 of second tank 23. A pump 79 present on oxidation line 78 is configured to enable the sewage to be withdrawn from second tank 23 and supply it to oxidation tank 77. Oxidation line 78 can also comprise at least one control valve and/or sensor communicating with control unit 49 in order to monitor and manage the flow passing through said oxidation line 78.

From a structural point of view, oxidation tank 77 comprises, in a non limiting way, a silos having a substantially cylindrical shape and extending, under the operative condition of tank 77, along a vertical direction. Effectively, tank 77 comprises a container having a bottom wall having a circular outline, a cylindrical side wall perimetrally connected to bottom wall, and a top wall located on the top of side wall.

Tank 77 defines inside a compartment 80 having a volume comprised between 0.1 $m^3$ and 15 $m^3$, particularly comprised between 0.2 $m^3$ and 10 $m^3$, still more particularly comprised between 0.25 $m^3$ and 1 $m^3$.

As it is shown for example in FIG. 8, tank 77 comprises at least one inlet 81, fluidically communicating with discharge outlet 25 of second tank 23, which enables the sewage to be supplied into the same tank 77.

As it is shown in FIG. 8, tank 77 comprises a circulating line 82 configured to enable the sewage to be withdrawn from bottom of tank 77 and configured to supply it at the top of said tank where the circulating line defines a second inlet 83.

Oxygenation tank 77 comprises a sloped support 84 configured to receive sewage supplied through second inlet 83. Support 84 comprises, in a non limiting way, a plate 85 having a main extension direction extending between first end 86, constrained to tank 77, and a second end 87, suspended inside tank 77 at a level lower than the level at which first end is located. The level difference (slope) of plate 85 enables the sewage, arriving from second inlet, to flow on the latter to the second end 72.

Further, tank 77 comprises a blowing device 88 positioned at second inlet 87 of plate 85 and particularly positioned below the latter. Blowing device 88 comprises a supply opening 89 directed towards sewage falling from second end 87 of plate 85: blowing air and/or nitrogen on the sewage film falling from the plate, causes a sewage oxidation reaction which promotes the dissociation from the latter of gases comprising nitrogen.

Gases exit an outlet line 90 fluidically communicating with gas recovering circuit and suitable for withdrawing gases comprising nitrogen dissociating from sewage.

The energy treatments/transfers performed in first and second tanks 5, 23, and oxidation treatment performed in tank 77 enable to form gases, comprising nitrogen, particularly comprising ammonia, which are collected inside the gas recovering circuit 10. Particularly, said gases are recovered thanks to a compressor 64 operatively active on said gas recovering circuit 10 and configured to supply said gases towards a gas inlet line 66.

Gas inlet line 66 fluidically communicates with third or refining tank 32 configured to collect and purify the recovered gases.

From a structural point of view, third tank 32 comprises, in a non limiting way, a silos having a substantially cylindrical shape extending, in an operative condition of third tank 32, along a vertical direction. In the shown example, tank 32 comprises a container having a bottom wall with a circular outline, a cylindrical side wall perimetrally connected to bottom wall, and an upper wall located on top of side wall.

Third tank 32 defines a compartment 67 having a volume comprised between 0.25 $m^3$ and 10 $m^3$, particularly comprised between 0.5 $m^3$ and 1 $m^3$.

Third tank 32 comprises a lower zone 32a adapted to receive an acid solution A in a liquid phase, and an upper zone 32b positioned above and fluidically communicating with the lower zone 32a and suitable for receiving a gaseous phase.

Figure 7:
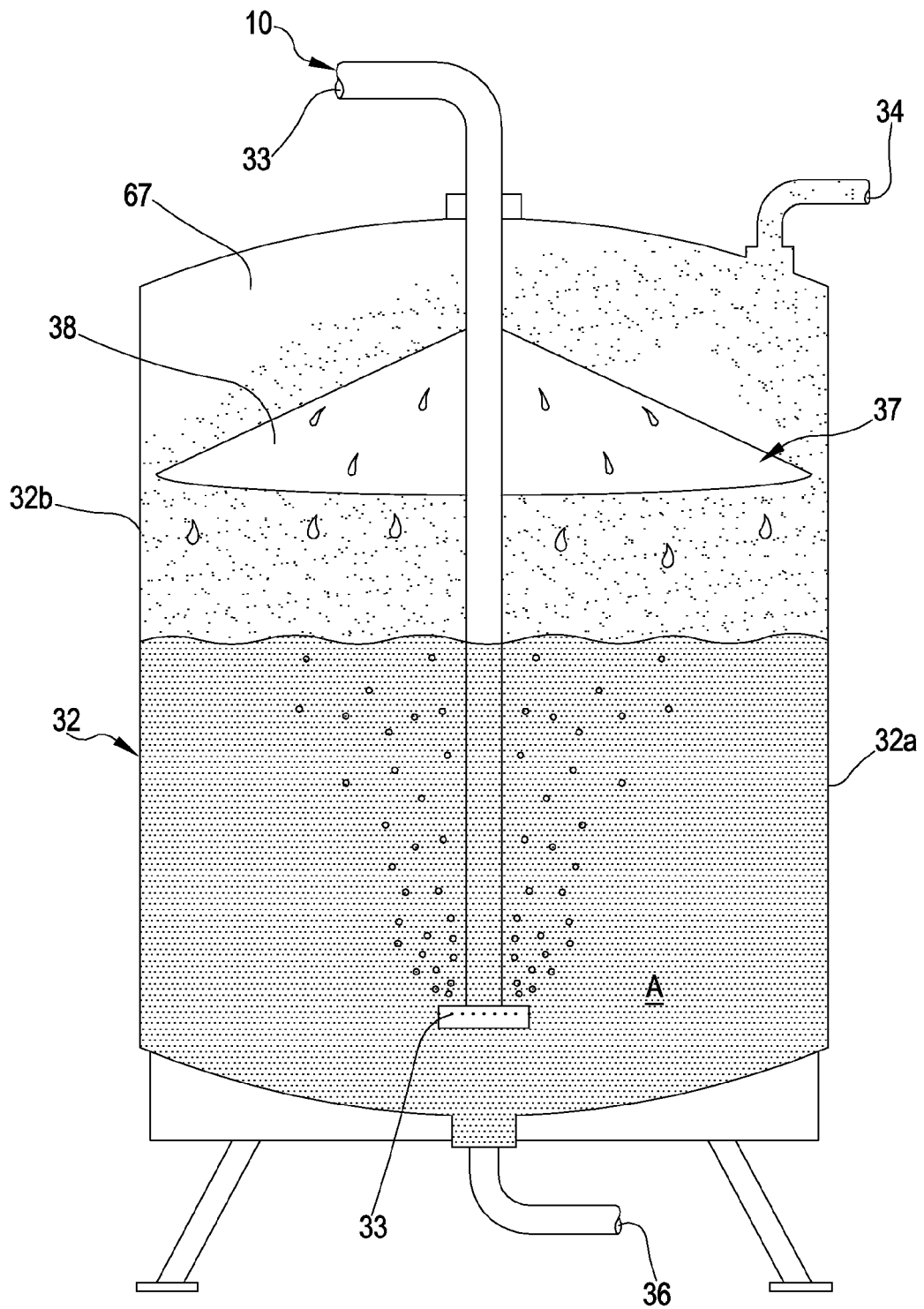
FIG. 7 shows a detail of apparatus in FIG. 6.

As it is shown for example in FIG. 7, third tank 32 comprises at least a gas inlet 33 fluidically communicating with gas inlet line 66 of gas recovering circuit 10: gas inlet 33 is advantageously positioned in proximity with the third tank 32 bottom: in this way the recovered gases introduced in third tank 32 immediately contact the acid solution A in the lower zone 32a.

As it is shown in FIG. 7, third tank further comprises at least one gas outlet 34 positioned at a top zone of third tank 32 and adapted to fluidically communicate the upper zone 32b to a gas outlet line 35.

Acid solution A is configured to determine, following a contact with gases arriving from inlet 33, the salification of ammonia present in said gases with $H^+$ ions of said acid solution A and the formation of a first flow of purified gas comprising nitrogen, having a percentage lower than the nitrogen percentage present in gases entering third tank 32.

More particularly, acid solution A comprises, in a non limiting way, a diluted solution of sulphuric acid and distilled water or, alternatively, just sulphuric acid ($H_2SO_4$).

In a preferred embodiment, acid solution A comprises at least sulphuric acid and distilled water: sulphuric acid percentage present in acid solution A is greater than or equal to the percentage of distilled water present in the acid solution. Specifically, the ratio of the sulphuric acid percentage to the distilled water percentage present in the acid solution is greater than 1, particularly greater than 1.5.

The chemical principle underlying this treatment, is related to the great capacity of the gaseous ammonia to solubilize in water, in which there are also $SO_4^=$ ions (due to the hydrolysis of water which shifts the chemical equilibrium of the acid dissociation) by forming a molecule of ammonium sulphate $[NH_4]2SO_4$ (the reaction is exothermic and, therefore, generates thermal energy: the temperature shifts the equilibrium of the reaction of the acid in the distilled water). In this way, it is possible to capture the ammonia gases for forming ammonium sulphate ($H_2SO_4$+ $2NH_3=[NH_4^+]2SO_4$), which is a stable salt and precipitates, when the concentration is averagely greater than 30% wt., particularly is greater than 50% wt., still more particularly is about 63% wt. (this factor varies according to the temperature and pressure in the system and atmosphere).

Refining tank 32 comprises a filtration element 37 arranged in the upper zone 32b; such filtration element 37 is configured to intercept the first purified gas flow and enable the formation of a second purified gas flow comprising a nitrogen percentage less than the nitrogen percentage present in the first purified gas flow.

Filtration element 37 substantially comprises a recovery plate configured to receive first gas flow exiting acid solution A and enable the condensation: the step of condensing at least a portion of the gas, enables to form a liquid which, falling from plate 38 towards acid solution A, enables to further abate gas comprising nitrogen.

Liquid falling from recovery plate 38, meets first gas flow containing nitrogen (particularly ammonia) ascending towards the recovery plate; because the gas, particularly ammonia $NH_3$, easily bind to the condensate, the latter defines at least one liquid, particularly $NH_4^+$, which falls again inside the lower zone 32a of third tank.

In this way, second gas flow contains less nitrogen gas so that it is more purified than first gas flow. Advantageously, recovery plate 38 is perimetrally countershaped to the compartment defined by lower zone 32b. The condensation reaction of a portion of gas, on the plate, is caused by a pressure increase of said gas generated by the plate and/or temperature of the latter.

The pressure increase of the gas flow ascending towards the upper zone is mainly caused by the choke defined by the recovery plate 38 which substantially reduces the gas cross-section. FIG. 7 schematically shows a first embodiment of third tank 32 having a supply conduit for the gases recovered in first and second tanks, merging at the top of second tank 32, and substantially extends at the bottom wall of the latter, where it defines gas inlet 33.

In the embodiment of FIG. 7, the recovery plate has an arched body having a concavity facing the lower zone 32b of third tank.

Figure 7A:
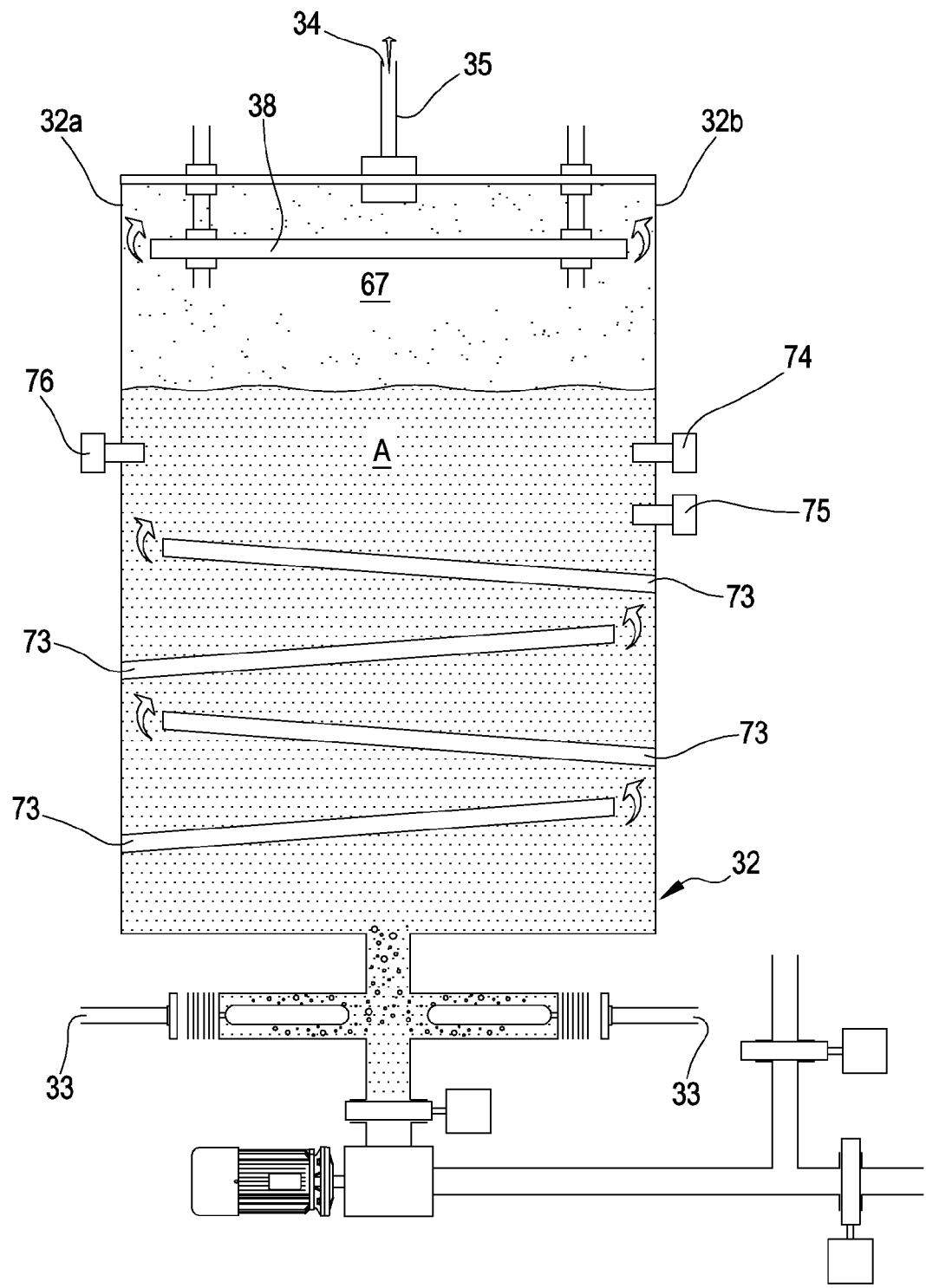
FIG. 7A shows an embodiment variant of the detail in FIG. 7.

In an embodiment variant of third tank 32 shown in FIG. 7A, third tank has a conduit supplying gases, directly leading to the bottom wall (the passage of the conduit inside the tank itself is absent) on which it is defined the gas inlet 33.

Inside solution A, in a non limiting way, it is arranged a series of intercepting elements 73 configured to define a zigzag path. The gas, introduced from inlet 33, ascends towards the recovery plate along the tortuous path.

It is useful to specify that gases introduced inside third tank 32 form, in the liquid solution, micro bubbles containing, for example, $NH_3$ and $O_2$ gases. The zigzag systems are for deforming the bubbles and increase the contact between the gases free in the micro bubbles, and the walls of the same, the latter contacting the acid solution; this enables acid to capture $NH_3$ molecules on all the surface of the bubble with a continuous exchange between liquid/gas.

The deformation process, caused by the tortuous system, causes a continuous inner exchange of the gases. Specifically, the continuous bubble deformation causes a distribution of new $NH_3$ molecules at the containment surface of the micro bubble: in this way, the acid solution can capture new $NH_3$ molecules in order to purify the gas flow introduced in the tank.

More in detail, the micro bubble, due to the surface tension, maintains its shape, and therefore gives ammonia gas to the acid solution so that the gas, exiting from acid solution, will be strongly purified.

As it is shown in FIG. 7A, third tank 32 comprises, in a non limiting way, a temperature sensor 74 and pH sensor 75 suitable for contacting the acid solution A and detecting temperature and pH, respectively.

Third tank, of FIG. 7A, further comprises a level sensor 76 adapted to monitor the level reached by the acid solution A inside third tank.

FIG. 6 shows, in a non limiting way, an embodiment of apparatus 1 comprising only one tank 32. More particularly, apparatus 1 can comprise a plurality of refining tanks 32 consecutive to each other and fluidically communicating (in cascade) to each other, configured to obtain purified gases having lower and lower ammonia contents.

As it is schematically shown in FIG. 8, apparatus terminates with one or more active carbon filters 39 adapted to receive the flow of purified gas exiting the last refining tank, in order to substantially enable to totally purify the gases before releasing them in the atmosphere.

It is useful to specify that the sewage energising by the microwave generator and/or electrolytic cell and/or ultrasound generator, enables to oxidize/reduce also other groups of substances included in the carbon chemistry.

More particularly, the energy transferred to the system, besides enabling to agitate the molecules of the nitrogen group (both the free molecules, as $NH_4$, or bound to carbon molecules as amines), also agitates the carbon bonds (both as single, double or triple bonds). This enables to reduce (to shorter chains and more easily biodegradable) long carbon chains (for example, linear hydrocarbons, alcohol, ketones, aldehydes, and alkanes and derivatives thereof, alkenes and derivates thereof, generic organic acids, proteins/aminoacids, sugars, vitamins) to more shorter chains and easily manageable for depuring from the chemical and biological point of view.

Such phenomenon is also effective for groups of cyclic and aromatic carbon chains, such as for example: phenols and polyphenols, cyclic/aromatic hydrocarbons, heterocyclic compounds.

De facto, in this way it is possible to "break down" the complex organic substance so that it can take a "simplified" form both for the depuration, and the production of renewable sources, such as biogas.

For this object, it is particularly useful to blow nitrogen in sewage, which in turn smooth the oxidation/reduction processes of the organic substance because it is directly solubilized in the solution before the electromagnetic treatment.

Effectively, apparatus 1 degradates the organic substance and enables to release, as gas, substances such as nitrogen (as ammonia and gaseous phase) which is a molecule limiting the biological depuration processes (ammonia intoxicates the bacteria responsible for the depuration because it reduces the degradation-digestion) and for the biogas production.

The recovery of the organic substances is more easier and less troublesome from the chemical and biological point of view by depuring the sewage of these easily volatile gases.

This can be a real and effective treatment for zootechnical sewage, organic sewage of industrial and residential origins, effectively, the use of this apparatus promotes the depuration processes and the production of biogas, especially of complex substances such as for example: sewage obtained by pressing products for producing vegetable oils (olives, generally seeds, etcetera), sewage obtained from poultry farming for producing meat and eggs, sewage obtained by the butchering, dairy production, treatment of organic urban wastes, agro industrial treatments, sewage obtained from residential and industrial foul water, sewage obtained from residential and industrial treatment containing hydrocarbons, alcohols, and all those carbon-based substances both linear, cyclic or aromatic.

Effectively, the apparatus, besides enabling to abate nitrogen present in sewage, offers a depuration treatment capable of substantially shorten, with a very limited power consumption, the oxidation/reduction reactions, which in turn promote the depuration of organic sewage or their recovery for producing renewable sources such as biogas (both for the use of dry matter and the use of liquid mass in digestors), or for producing compost.

Moreover, the apparatus promotes the carbon cycle, so that the processed (or digested) substances can return to the compost chain production (without any polluting consequence) for an agricultural or environmental use in order to counter the desertification phenomena of the agricultural areas and increase a general fertility of soils.

Method of Treating Sewage.

It is also an object of the present invention a method of treating sewage.

Such method provides a step of withdrawing sewage by first pump 47 and supply the latter to a withdrawing line 44. Then or simultaneously to the sewage withdrawing step, it is provided a step of withdrawing water by a second pump 48 and supply said water to a supply line 45. Sewage and water can be supplied to first or pre-treatment tank 5 wherein the sewage is mixed with water. Mixing step can be performed inside first tank 5 and/or inside an inlet line 46, where withdrawing line 44 and supply line 45 merge.

First tank 5 is supplied, in a non limiting way, with a predetermined sewage amount to be treated. After the sewage supply, the method comprises a step of pre-treating the sewage present in first tank 5 by two or more of the following treatments: an ultrasound treatment, a microwave electromagnetic treatment, an electrolytic process. Specifically, pre-treatment step comprises an electrolytic treatment step and energy transfer step, particularly a temperature raising treatment. As previously discussed, electrolytic transfer and energy transfer steps (pre-treatment step) cause the dissociation from sewage of gases comprising nitrogen, particularly ammonia, thanks to a sewage oxidation and/or reduction process.

More particularly, the predetermined sewage amount treated during the pre-treatment step, has a volume greater than $0.5\ m^3$, particularly comprised between $1\ m^3$ and $50\ m^3$, still more particularly comprised between $1\ m^3$ and $10\ m^3$. The pre-treatment step duration takes more than 3 minutes, particularly is comprised between 3 and 300 minutes, still more particularly is comprised between 30 and 120 minutes.

As said, pre-treatment step provides an electrolytic step, which comprises a substep of positioning at least two electrodes 11 at least partially contacting the predetermined sewage amount present in first tank 5 and electrically connected to at least one electric power generator 12. Generator 12 has an electric power greater than 1 kW, particularly has an electric power comprised between 3 and 20 kW, still more particularly has an electric power comprised between 5 and 15 kW.

Electric power generator 12 determines on electrodes 11 a potential difference determining an electric current flow in fluid. The electric current flow substantially determines an inverse electrolysis process which, thanks to the electric current transfer in the fluid, causes a chemical reaction in the same. Such reaction enables to release from fluid at least a gas comprising nitrogen, particularly at least ammonia. Based on the chemical reaction in the fluid, in other words based on the obtained dissociation level, it is obtained a predetermined electric current intensity. Particularly, the electric current intensity flowing through said fluid is greater than 4 Ampere, particularly is comprised between 4 and 25 Ampere, still more particularly is comprised between 5 and 20 Ampere.

Simultaneously with the electrolytic treatment step, the method comprises the energy transfer step, in other words a sewage heating step. This step comprises a microwave electromagnetic treatment step and a step of blowing inside the predetermined sewage amount at least one gas having a temperature greater than the temperature of the sewage to be treated. Heating step enables to raise the temperature of the predetermined amount of sewage present in first tank to a temperature comprised between 30° C. and 90° C., particularly between 35° C. and 85° C., still more particularly between 40° C. and 80° C. The electromagnetic treatment step has a strong sterilizing power both due to the consequent temperature increase and due to the bactericidal and sporicidal powers of microwaves. As previously mentioned, sewage heating step can be performed, in a non limiting way, by a microwave electromagnetic treatment step and a step of blowing air warmer than sewage.

The microwave electromagnetic treatment step comprises the microwave generation by at least one microwaves generator 9a, particularly a magnetron. Microwave generator 9a is configured to generate waves at a frequency comprised between 1 GHz and 4 GHz, particularly between 1.5 GHz and 3 GHz, still more particularly between 2.3 GHz and 2.6 GHz.

Blowing step comprises a gas introduction, particularly air, inside the sewage at a temperature greater than the one of sewage to be treated. More specifically, blowing step comprises an air introduction inside the predetermined sewage amount, at a temperature comprised between 30° C. and 90° C., particularly between 35° C. and 85° C., still more particularly between 40° C. and 80° C. The heated air introduction inside the sewage promotes, besides the heating, also the oxidation of the organic matter. The gas blowing step inside the predetermined sewage amount comprises a substep of cooling the microwave generator 9a by an air flow: the air flow exiting the generators 9a cooling step is recovered and used for the blowing step. Therefore, sewage heating and oxidation comprise a substep of reintroducing inside the sewage the air exiting the microwave generator 9a cooling step.

The method comprises, at least during the electrolytic treatment and/or microwave energy transfer step, a step of mechanically stirring the predetermined sewage amount. Stirring step comprises stirring the predetermined sewage amount by a stirring device 20, for example a helix 21 connected to an electric motor 22.

Stirring sewage enables to homogenize the sewage present in first tank 5 in order to make more effective the operation of electrolytic and energy transfer processes. Keeping constant the stirred sewage amount counters the generation of "counter-electromotive forces", which could stabilize the electrochemical process as the time goes by, reducing the capacity of degradating the organic substance. During the pre-treatment step, at least part of sewage present in first tank is caused to continuously recirculate inside a closed circuit.

During the sewage recirculation step inside the closed circuit, the latter passes through at least one forced passage; at least one between the electrodes pair and microwave generator is arranged at the forced passage so that it respectively enables to transfer energy to sewage passing from forced passage in order to promote the separation from sewage of gases comprising nitrogen, preferably ammonia.

Particularly, during the sewage recirculation step in the closed circuit, the sewage is forced to pass through a plurality of consecutive forced passages 17 and is irradiated by microwaves; the irradiation substep uses electromagnetic waves generators 9a operative on a series or on all the forced passages 17. During the step of forcedly passing sewage, sewage currents of limited thickness are formed in the corresponding forced passages 17, the thickness being not greater than 7 mm, particularly not greater than 5 mm, said currents are facing at least one corresponding microwave generator 9a so that they are completely crossed by said electromagnetic waves.

It is useful to specify that at least one of the electrolytic treatment and energy transfer steps can be performed on the predetermined sewage amount present in first tank and/or on sewage passing from the closed circuit.

After the pre-treatment step, at least a portion of the predetermined sewage amount is supplied to a second tank 23. Sewage, withdrawn from first tank and sent to second tank, has a volume of at least 0.5 m$^3$, particularly of 1 m$^3$, still more particularly of 5 m$^3$. Specifically, the ratio of the sewage volume present in first tank during the pre-treatment step to the sewage volume withdrawn and supplied to second tank, is greater than 2, particularly greater than 3, still more particularly greater than 4.

During or following the step of withdrawing a portion of the predetermined sewage amount from first tank, method comprises a substep of integrating energy in first tank with not treated sewage, for maintaining substantially constant the predetermined sewage amount in first tank. More particularly, during the step of withdrawing at least a portion of the predetermined sewage amount, method comprises a step of supplying a not treated sewage amount to first tank substantially equal to the amount withdrawn from first tank and supplied to second tank. Sewage present in second tank is subjected to an energy transfer step comprising at least one ultrasound treatment step (following the electrolytic and thermal treatment steps) suitable for promoting the dissociation from sewage of gases comprising at least ammonia.

The sewage ultrasound treatment step comprises irradiating sewage by ultrasonic waves having a frequency greater than 20 kHz, particularly comprised between 25 kHz and 45 kHz, still more particularly between 30 kHz and 35 kHz. The ultrasound treatment has a duration comprised between 30 minutes and 300 minutes, particularly comprised between 30 minutes and 120 minutes.

During the ultrasound treatment step, method comprises a step of blowing at least one gas inside the sewage adapted to promote the oxidation of sewage and the separation of gases comprising ammonia from the sewage itself. The gas blown during the sewage ultrasound treatment step, comprises air, particularly comprises oxygen and/or ozone.

Blown gas besides enabling a further oxidation of the organic matter present in second tank 23, promotes the outflow from sewage of gases comprising nitrogen.

Moreover, the method comprises, in a non limiting way, a sewage oxidation step. Specifically, at least a portion of the sewage discharged by second tank 23, at the end of the ultrasonic treatment, is supplied to oxidation tank 77. Sewage withdrawn from second tank 23 is caused to circulate in tank 77 simultaneously with a step of blowing air and/or nitrogen inside the circulating sewage. Blowing air and/or nitrogen promotes the oxidation of sewage with a consequent dissociation of at least a portion of nitrogen contained in the latter.

Further, method comprises a step of separating gases comprising nitrogen, preferably ammonia, from sewage present in tanks 5, 23 and 77 (first, second and oxidation tank, respectively) and a following step of recovering said gases inside a gas recovering circuit 10.

Moreover, the method provides at least a step of refining the collected gases adapted to purify said gases from nitrogen, particularly ammonia. The refining step comprises a step of blowing said collected gases inside at least a third tank 32 containing an acid liquid solution A.

The liquid acid solution A comprises at least one diluted solution of sulphuric acid and distilled water or sulphuric acid. More particularly, acid solution A comprises distilled water and sulphuric acid, wherein the ratio of the sulphuric acid percentage to distilled water percentage present in the acid liquid solution is greater than 1, particularly greater than 1.5.

Blowing gases inside solution A enables to form ammonium salts by the salification of the ammonia bond present in the collected gases with $H^+$ ions of the liquid acid solution. The salification of at least a portion of the collected gases generates inside third tank 32 vapours containing a percentage of ammonia smaller than the percentage of ammonia of said collected gases.

After the first gas flow formation, there is a step of abating the ammonia possibly present in first purified gas flow for forming a second purified gas flow containing an ammonia percentage smaller than the percentage present in first gas flow.

Particularly, the step of abating ammonia comprises a step of providing at least one filtration element 37 inside third tank and particularly arranged above the acid solution A.

De facto, first gas flow contacts filtration element 37 which promotes the condensation of vapours of said gas for forming at least one liquid comprising, for example, water $H_2O$ and ammonia $NH_4^+$: the liquid, by precipitating in the acid solution A, contacts the first gas flow ascending towards the filtration element 37. The substantial capacity of the ammonia gas to bind with the liquid (condensate) falling from filtration element 37, enables to dissolve gaseous ammonia of first purified gas flow for forming gases depurated from ammonia gases. In this way, there is the formation of said second gas flow. The method can comprise a plurality of steps of said refining steps consecutive to each other for obtaining purified gases having lower and lower contents of ammonia.

Besides the purification of gases, the method comprise at least one step of chemically filtrating the purified gases outflowing from the latter refining step by means of active carbon filters. In this way, it is possible to release the gases generated during said method for treating sewage in the atmosphere.

The method can comprise cycles of rinsing the treatment circuit 2. The rinsing step comprises a step of stopping first pump 46, for preventing the sewage from entering the treatment circuit 2, and a step of supplying water in the latter through the supply line 45. A predetermined water amount is caused to continuously circulate between the inlet 3 and outlet 4 of circuit 2. Apparatus rinsing cycles depend on the type of treated material, particularly depend on the sewage viscosity.

More particularly, the method can comprise a rinsing cycle, after a number of cycles of a predetermined sewage amount, greater than 3, particularly comprised between 3 and 40, still more particularly comprised between 3 and 15.

ADVANTAGES OF THE INVENTION

By the above mentioned method and apparatus, it is possible to implement a treatment capable of accomplish several applications for improving the purification of gases outflowing from the treatment, by minimizing the presence of microbial forms in sewage.

Effectively, such method/apparatus is capable of degrading sewage so that the latter can be reused, for example as fertilizer, ensuring in this way a complete abatement of microbial forms which could pass from soil to the cultivated food products.

Depurating sewage from ammonia is made very effective thanks to the combination of the pre-treatment and treatment steps according to the invention. Specifically, both the electrolytic and ultrasound treatments take advantage of the preceding microwave treatment and homogenization step obtained by the forced passages and mixing.

The described method/apparatus enables to purify sewage and the formed gases with a reduced energy consumption and consequently with limited operating costs. To this matter, the steps of using the gas cooling the microwave generators for pre-heating the treated mass and also the choice of transferring from first to second tank just a portion of the mass contained in first tank are particularly interesting.

The invention claimed is:

1. A sewage treatment method, comprising:
    at least one step of electrolytic treatment of sewage;
    at least an energy transfer step being performed simultaneously with the at least one step of electrolytic treatment of sewage, wherein the energy transfer step comprises performance of at least one of a temperature raising treatment and an ultrasound treatment of the sewage; and
    at least one separation step, wherein the at least one separation step comprises using the electrolytic treatment step and the energy transfer step to determine a dissociation of gases from the sewage, the gases comprising nitrogen or ammonia and performing separation of the gases from the sewage.

2. The method of claim 1, wherein the energy transfer step comprises a microwave electromagnetic treatment step and an injection step of blowing into the sewage at least one gas having a higher temperature than a temperature of the sewage to be treated to facilitate oxidation and heating of the sewage, wherein the energy transfer step comprises heating the sewage to bring a temperature of the sewage up to a temperature between 25° C. and 90° C., and wherein the electrolytic treatment step and the energy transfer step cause a dissociation of gases from the sewage, the gases comprising at least ammonia due to an oxidation and/or reduction process.

3. The method of claim 2, wherein the microwave electromagnetic treatment step further comprises generation of microwaves by at least one microwave generator, wherein the microwave generator is configured to generate waves at a frequency between 1 GHz and 4 GHz.

4. The method of claim 3, wherein the microwave electromagnetic treatment step further comprises a step of cooling the microwave generator by means of an air flow, and wherein the sewage heating and oxidation of the sewage comprises a sub-step of reintroducing into the sewage air exiting the microwave generator from the cooling step of the microwave generator.

5. The method of claim 2, wherein the energy transfer step further comprises heating the sewage to bring a temperature of the sewage up to a temperature between 30° C. and 85° C., or wherein the energy transfer step comprises heating the sewage to bring a temperature of the sewage up to a temperature between 35° C. and 80° C.

6. The method of claim 3, wherein the microwave generator is further configured to generate waves at a frequency between 1.5 GHz and 3 GHz, or wherein the microwave generator is further configured to generate waves at a frequency between 2.3 GHz and 2.6 GHz.

7. The method of claim 1, wherein the electrolytic treatment step and the energy transfer step cause a degradation of organic compounds having a high molecular weight and present in the sewage into organic compounds having a lower molecular weight.

8. The method of claim 1, wherein the energy transfer comprises a step of blowing into the sewage at least one gas comprising air and/or ozone suitable for facilitating oxidation of the sewage.

9. The method of claim 1, wherein the electrolytic treatment step and the energy transfer step comprise treatment of a predetermined quantity of sewage for a predetermined treatment time, and wherein the predetermined quantity of sewage exhibits a volume greater than 0.5 m$^3$, and wherein the predetermined treatment time exhibits a duration greater than 15 minutes.

10. The method of claim 9, wherein, during the electrolytic treatment step and the energy transfer step, at least a part of the predetermined quantity of sewage is continuously recirculated inside a closed circuit, and wherein during the sewage recirculating step inside the closed circuit, the sewage passes through at least one forced passage, wherein at least a pair of electrodes of an electrolytic cell and the microwave generator are arranged at the forced passage to respectively enable energy transfer to the sewage passing from the forced passage to facilitate the dissociation of gases comprising at least nitrogen or ammonia from the sewage.

11. The method of claim 10, wherein the sewage recirculating step further comprises:
forcing the sewage to pass through a plurality of consecutive forced passages; and
irradiating the sewage passing through the forced passages using electromagnetic wave generators operating at a series of the forced passages.

12. The method of claim 9, wherein the predetermined quantity of sewage exhibits a volume of between 0.5 m$^3$ and 50 m$^3$, or wherein the predetermined quantity of sewage exhibits a volume of between 1 m$^3$ and 10 m$^3$.

13. The method of claim 9, wherein the predetermined time exhibits a duration of between 15 minutes and 300 minutes, or wherein the predetermined time exhibits a duration of between 30 minutes and 120 minutes.

14. The method of claim 11, wherein forcing the sewage to pass through the plurality of consecutive forced passages forms, at the forced passages, respective currents of sewage of not greater than 10 mm or respective currents of sewage not greater than 6 mm, wherein the respective currents are configured to face at least one respective microwave generator so as to be entirely crossed by electromagnetic waves generated by the at least one respective microwave generator.

15. The method of claim 1, wherein the energy transfer step comprises performance of at least an ultrasound treatment step, following the electrolytic treatment step and temperature raising treatment step, wherein the performance of at least the ultrasound treatment step facilitates dissociation of gases from the sewage, the gases comprising at least nitrogen or ammonia, and wherein the ultrasound treatment step of the sewage includes irradiation of the sewage by ultrasound waves having a frequency of greater than 20 KHz.

16. The method of claim 15, wherein, during the ultrasound treatment step, the method comprises a step of blowing at least one gas into the sewage to facilitate oxidation of the sewage and the separation of gases comprising nitrogen or ammonia from the sewage, and wherein the gas blown during the ultrasound treatment step of the sewage comprises air, oxygen, and/or ozone.

17. The method of claim 15, wherein the ultrasound treatment step of the sewage includes irradiation of the sewage by ultrasounds having a frequency of between 25 KHz and 45 KHz, or wherein the ultrasound treatment step of the sewage includes irradiation of the sewage by ultrasounds having a frequency of between 30 KHz and 35 KHz.

18. The method of claim 1, further comprising:
at least one step of collecting the gases comprising nitrogen or ammonia separated from the sewage; and
at least one following step of refining the collected gases, comprising:
blowing the collected gases into an acid liquid solution,
forming ammonia salts by a salification of the ammonia present in the gases collected with the H$^+$ ions of the acid liquid solution,
forming a first purified gas flow containing a percentage of nitrogen or ammonia that is lower with respect to a percentage of nitrogen or ammonia present in the collected gases, and
reducing the nitrogen present in the first purified gas flow to form a second purified gas flow containing a percentage of nitrogen or ammonia that is lower than the percentage of nitrogen or ammonia present in the first purified gas flow.

19. An apparatus for treatment of sewage, comprising:
at least one sewage treatment circuit having at least one circuit inlet for receiving a load of sewage to be treated, and at least one circuit outlet for enabling expulsion of the treated sewage;
at least one first tank operatively active on the treatment circuit, the first tank comprising at least one inlet in fluid communication with the at least one circuit inlet of the treatment circuit, and at least one discharge outlet in fluid communication with the at least one circuit outlet of the treatment circuit;
at least an electrolytic cell associated to the first tank and configured to treat the sewage, present inside the first tank or coming from the first tank, to facilitate formation of gases comprising nitrogen or ammonia;
at least an energising device associated to the first tank and configured to subject the sewage, present inside of the first tank or coming from the first tank, to at least one treatment selected from the group comprising:
a temperature raising treatment, and
an ultrasound treatment,
the energising device being configured to enable the oxidation and/or reduction of the sewage and to facilitate the dissociation of gases comprising nitrogen or ammonia, wherein the electrolytic cell and the energising device are configured to perform respective treatments of the sewage simultaneously; and
at least one gas recovering circuit in fluid communication with the first tank and configured to enable a flow of gases comprising nitrogen or ammonia from the first tank.

20. The apparatus of claim 19, further comprising
at least one recirculating device having:
an auxiliary tank, an inlet branch to the auxiliary tank, the inlet branch enabling removal of the sewage from the first tank, and an outlet branch from the auxiliary tank, the outlet branch enabling re-introduction of the sewage into the first tank.

21. The apparatus of claim 20, wherein the auxiliary tank comprises a plurality of chokes, each of which defines a respective forced passage for the sewage circulating in the auxiliary tank, and wherein the apparatus further comprises at least one microwave generator externally engaged to the auxiliary tank at a forced passage, the at least one microwave generator being configured to generate electromagnetic waves in a direction of the forced passage, and wherein the auxiliary tank comprises at least one window that is radio transparent to the frequencies of the electromagnetic radiation at the forced passage.

22. The apparatus of claim 19, wherein the energising device comprises at least one microwave generator configured to irradiate the sewage present in the first tank and/or in the recirculating device by executing at least partially the heat raising treatment.

23. The apparatus of claim 19, wherein the energising device comprises at least one blowing device connected to the first tank and/or to the recirculating device, the at least one blowing device being configured to inject into at least one of the first tank and the recirculating device air at a temperature between 25° C. and 90° C., by at least partially carrying out the heat treatment.

24. The apparatus of claim 23, wherein the energising device is further configured to inject into at least one of the first tank and/or the recirculating device thereof air at a temperature of between 30° C. and 85° C., or wherein the energising device is configured to inject into at least one of the first tank and/or the recirculating device, air at a temperature comprised of 35° C. and 80° C.

25. The apparatus of claim 19, comprising at least one second tank operatively active on the treatment circuit and interposed between the first tank and the circuit outlet of the treatment circuit, the second tank comprising at least an inlet in fluid communication with the discharge outlet of the first tank and at least one discharge outlet in fluid communication with the circuit outlet of the treatment circuit,
wherein the apparatus further comprises:
at least an ultrasound generator configured to irradiate the sewage present in the second tank to facilitate the dissociation of gases comprising at least nitrogen or ammonia, and wherein the ultrasound generator is configured to generate ultrasounds at a frequency of greater than 20 KHz.

26. The apparatus of claim 25, wherein the second tank further comprises an auxiliary gas inlet to the second tank, the auxiliary gas inlet being located at a bottom portion of the second tank, the apparatus further comprising a blowing device in fluid communication with the auxiliary gas inlet of the second tank, the blowing device being configured to inject at least one gas comprising air, oxygen, and/or ozone inside the second tank.

27. The apparatus of claim 25, wherein the ultrasound generator is further configured to generate ultrasounds at a frequency of between 25 KHz and 45 KHz, or wherein the ultrasound generator is configured to generate ultrasounds at a frequency of between 30 KHz and 35 KHz.

28. The apparatus of claim 19, further comprising at least one third tank, the at least one third tank comprising:
a lower zone configured to accommodate an acid solution in liquid phase and an upper zone located at a position above the lower zone relative to the lower zone of the at least one third tank, the upper zone being in fluid communication with the lower zone and configured to accommodate a gaseous phase;

at least one gas inlet located in proximity of a bottom portion of the third tank, the at least one gas inlet configured to place the lower zone in fluid communication with a gas recovering circuit;

at least one gas outlet located at a top zone of the third tank, the at least one gas outlet configured to place the upper zone in fluid communication with a gas outlet line, and wherein the acid solution comprises at least one of:
a diluted solution of sulphuric acid and distilled water, and
sulphuric acid, and wherein following contact with the gas arriving from the at least one gas inlet of the at least one third tank, the acid solution is configured to determine a salification of ammonia present in the gases with $H^+$ ions of the acid solution to generate of a first flow of purified gas comprising ammonia in a percentage smaller than a percentage of ammonia present in the gases entering into the at least one third tank.

29. The apparatus of claim 28, wherein the at least one third tank further comprises:
at least one filter element arranged in the upper zone, the at least one filter element being configured to intercept the first purified gas flow to enable formation of a second purified gas flow comprising a percentage of nitrogen or ammonia that is lower than a percentage of nitrogen or ammonia present in the first purified gas flow, and wherein the at least one filter element comprises a recovery plate having a lower surface having an arched profile exhibiting a concavity facing towards the lower zone of the at least one third tank.

30. A method of treating sewage, comprising:
energizing sewage by at least one treatment or process selected from the group comprising:
subjecting the sewage to an ultrasound treatment,
subjecting the sewage to a microwave electromagnetic treatment, and
subjecting the sewage to an electrolytic process to enable dissociation of gases comprising nitrogen or ammonia from the sewage;
collecting the gases dissociated from sewage; and
refining the collected gases, wherein refining the collected gases comprises:
blowing the collected gases in an acid liquid solution,
forming salts of ammonium by salification of ammonia present in the collected gases with $H^+$ ions of the liquid acid solution,
forming a first flow of purified gas containing a percentage of nitrogen or ammonia smaller than a percentage of nitrogen or ammonia present in the collected gases, and
abating nitrogen present in first purified gas flow to form a second purified gas flow containing a nitrogen percentage smaller than the nitrogen percentage present in the first purified gas flow.

31. An apparatus for treating sewage, comprising:
at least one sewage treatment circuit comprising at least one circuit inlet for receiving a sewage load to be treated, and at least one circuit outlet for enabling the sewage to be expelled;
at least one energising tank operatively active on the treatment circuit, the energising tank comprising at least one inlet in fluid communication with the at least one circuit inlet of the treatment circuit, and at least one discharge outlet, the at least one discharge outlet in fluid communication with at least the at least one circuit outlet of the treatment circuit;

at least one energising device associated to the energising tank, the at least one energising device configured to transfer energy to the sewage present inside the energising tank to promote formation of gases comprising nitrogen or ammonia, the energising device comprising at least one of:
an ultrasound generator,
a microwave generator, and
an electrolytic cell;

at least one gas recovering circuit in fluid communication with the energising tank for receiving the gases;

at least one refining tank comprising a lower zone configured to receive a liquid phase acid solution and an upper zone positioned above the lower zone and in fluid communication with the lower zone, the upper zone being configured to receive a gaseous step:
at least one gas inlet, positioned in proximity with a bottom portion of the refining tank and configured to place the lower zone of the at least one refining tank in fluid communication with the gas recovering circuit; and
at least one gas outlet positioned at a top zone of the at least one refining tank and configured to place the upper zone of the at least one refining tank in fluid communication with a gas outlet line, wherein, following a contact with gases arriving from the at least one gas inlet, an acid solution is configured to determine:
the salification of ammonia present in the gases with $H^+$ ions of the acid solution,
the generation of a first purified gas flow comprising nitrogen or ammonia, in a percentage smaller than the percentage of nitrogen or ammonia present in gases entering the at least one refining tank, the at least one refining tank comprising at least one filtration element being configured to intercept the first purified gas flow and enable formation of a second purified gas flow comprising a nitrogen or ammonia percentage lower than the nitrogen or ammonia percentage present in the first purified gas flow.

* * * * *